US010865326B2

(12) United States Patent
Jordan et al.

(10) Patent No.: US 10,865,326 B2
(45) Date of Patent: Dec. 15, 2020

(54) COATING COMPOSITIONS, ELASTIC BARRIER COATINGS FORMED THEREFROM, AND METHODS OF APPLYING SUCH COATINGS

(71) Applicant: PPG Industries Ohio, Inc., Cleveland, OH (US)

(72) Inventors: Jennifer Tamaki Jordan, Pittsburgh, PA (US); Roxalana L. Martin, Pittsburgh, PA (US); Dennis Leroy Faler, North Huntingdon, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 68 days.

(21) Appl. No.: 15/709,726

(22) Filed: Sep. 20, 2017

(65) Prior Publication Data
US 2019/0085200 A1 Mar. 21, 2019

(51) Int. Cl.
C09D 163/00 (2006.01)
C08G 59/24 (2006.01)
C09D 193/00 (2006.01)
C09D 181/04 (2006.01)
C09D 175/04 (2006.01)
C09D 179/06 (2006.01)
C09D 175/02 (2006.01)
C08G 18/76 (2006.01)
C08G 18/67 (2006.01)
C08G 18/24 (2006.01)
C08F 283/00 (2006.01)
C08G 18/75 (2006.01)
C08G 18/18 (2006.01)
C08G 18/48 (2006.01)
C08G 18/34 (2006.01)
C08G 18/28 (2006.01)
C08G 59/66 (2006.01)
C08G 18/32 (2006.01)
C08G 18/42 (2006.01)
C08L 63/00 (2006.01)
C08K 5/25 (2006.01)

(52) U.S. Cl.
CPC ........ C09D 163/00 (2013.01); C08F 283/006 (2013.01); C08G 18/18 (2013.01); C08G 18/246 (2013.01); C08G 18/2875 (2013.01); C08G 18/3228 (2013.01); C08G 18/348 (2013.01); C08G 18/4238 (2013.01); C08G 18/4858 (2013.01); C08G 18/672 (2013.01); C08G 18/755 (2013.01); C08G 18/7621 (2013.01); C08G 59/245 (2013.01); C08G 59/66 (2013.01); C08L 63/00 (2013.01); C09D 175/02 (2013.01); C09D 175/04 (2013.01); C09D 179/06 (2013.01); C09D 181/04 (2013.01); C09D 193/00 (2013.01); C08K 5/25 (2013.01)

(58) Field of Classification Search
CPC .. C09D 193/00; C09D 175/00; C09D 175/02; C09D 175/04; C09D 163/00; C09D 181/04; C09D 179/06; C08G 18/18; C08G 18/246; C08G 18/2875; C08G 18/3228; C08G 18/348; C08G 18/4238; C08G 18/4858; C08G 18/672; C08G 18/755; C08G 18/7621; C08G 59/245; C08G 59/66; C08K 5/25; C08F 283/006
See application file for complete search history.

(56) References Cited

U.S. PATENT DOCUMENTS

| | | |
|---|---|---|
| 3,279,936 A | 10/1966 | Forestek |
| 4,598,121 A | 7/1986 | Disteldorf et al. |
| 4,650,718 A | 3/1987 | Simpson et al. |
| 4,704,176 A | 11/1987 | Botzman |
| 4,888,383 A | 12/1989 | Huybrechts |
| 4,933,056 A | 6/1990 | Corrigan et al. |
| 4,983,662 A | 1/1991 | Overbeek et al. |
| 5,147,926 A | 9/1992 | Meichsner et al. |
| 5,348,997 A | 9/1994 | Kato et al. |
| 5,472,996 A | 12/1995 | Hayashi et al. |
| 5,530,043 A | 6/1996 | Zawacky et al. |
| 5,534,569 A | 7/1996 | Etoh |
| 5,571,861 A | 11/1996 | Klien et al. |
| 5,614,582 A | 3/1997 | Hori et al. |

(Continued)

FOREIGN PATENT DOCUMENTS

| | | |
|---|---|---|
| CA | 2186776 A1 | 3/1998 |
| CA | 2219835 A1 | 5/1998 |

(Continued)

OTHER PUBLICATIONS

Boguslayskaya et al., "Effect of rubber functional groups on the intensity of rubber-filled interfacial interactions", Kauchuk i Rezina, 1988, vol. 11, pp. 14-17.

(Continued)

Primary Examiner — Christopher M Rodd
(74) Attorney, Agent, or Firm — Julie W. Meder

(57) ABSTRACT

A coating composition that includes a polymer having (i) a barrier segment with aromatic groups and urethane linkages, urea linkages, or a combination thereof and (ii) an elastomeric segment that is different from (i). The barrier segment makes up at least 30 weight % of the polymer based on the total solids weight of the polymer. Further, the composition also includes an adhesion promoter having: (a) at least one epoxy functional polymer and a thiol functional crosslinker reactive with the epoxy functional polymer; and/or (b) a hydrazide functional component.

32 Claims, 6 Drawing Sheets

(56) References Cited

U.S. PATENT DOCUMENTS

| | | |
|---|---|---|
| 5,656,701 A | 8/1997 | Miyamoto et al. |
| 5,660,890 A | 8/1997 | Rudy et al. |
| 5,705,549 A | 1/1998 | Hojo |
| 5,709,918 A | 1/1998 | Kimijima et al. |
| 5,760,107 A | 6/1998 | Valko et al. |
| 5,814,410 A | 9/1998 | Singer et al. |
| 5,820,987 A | 10/1998 | Kaufman et al. |
| 5,891,981 A | 4/1999 | Mauer et al. |
| 5,912,293 A | 6/1999 | Stockwell et al. |
| 6,063,861 A | 5/2000 | Irle et al. |
| 6,203,913 B1 | 3/2001 | Kondos et al. |
| 6,239,209 B1 | 5/2001 | Yang et al. |
| 6,277,905 B1 | 8/2001 | Keep |
| 6,309,494 B1 | 10/2001 | Koch et al. |
| 6,455,631 B1 | 9/2002 | Blum et al. |
| 6,555,625 B1 | 4/2003 | Overbeek et al. |
| 6,579,932 B1 | 6/2003 | Schipper et al. |
| 6,635,706 B1 | 10/2003 | Petschke et al. |
| 6,706,818 B2 | 3/2004 | Ishihara et al. |
| 6,762,240 B2 | 7/2004 | Swarup et al. |
| 6,765,056 B2 | 7/2004 | Hobel et al. |
| 7,476,705 B2 | 1/2009 | Pajerski |
| 7,531,074 B2 | 5/2009 | Purdy et al. |
| 7,576,157 B2 | 8/2009 | Pajerski |
| 8,283,405 B2 | 10/2012 | Yukawa |
| 8,436,084 B2 | 5/2013 | Kawaguchi et al. |
| 8,461,253 B2 | 6/2013 | Ambrose et al. |
| 8,716,402 B2 | 5/2014 | Temple et al. |
| 8,846,156 B2 | 9/2014 | Swarup et al. |
| 8,900,667 B2 | 12/2014 | Boggs et al. |
| 8,901,244 B2 | 12/2014 | Pajerski |
| 9,102,783 B2 | 8/2015 | Yagi et al. |
| 9,127,125 B2 | 9/2015 | Hartig et al. |
| 9,149,835 B2 | 10/2015 | Swarup et al. |
| 9,303,181 B2 | 4/2016 | Zhang et al. |
| 9,365,731 B2 | 6/2016 | Jhaveri et al. |
| 9,365,739 B2 | 6/2016 | Dombrowski et al. |
| 2001/0024693 A1 | 9/2001 | Morimoto et al. |
| 2002/0157761 A1 | 10/2002 | Bender et al. |
| 2004/0068036 A1 | 4/2004 | Halladay et al. |
| 2004/0096590 A1 | 5/2004 | Sasaki et al. |
| 2005/0197480 A1 | 9/2005 | Temple et al. |
| 2006/0121204 A1 | 6/2006 | Nakae et al. |
| 2006/0148980 A1 | 7/2006 | Tielemans et al. |
| 2006/0231589 A1 | 10/2006 | Wakamori |
| 2006/0235244 A1 | 10/2006 | Wakamori |
| 2007/0276068 A1 | 11/2007 | Hintzer et al. |
| 2009/0117396 A1 | 5/2009 | Furusawa et al. |
| 2010/0092766 A1 | 4/2010 | Stine et al. |
| 2011/0070374 A1 | 3/2011 | Ambrose et al. |
| 2011/0300389 A1 | 12/2011 | Kitagawa et al. |
| 2012/0021228 A1 | 1/2012 | Kitagawa et al. |
| 2012/0041113 A1 | 2/2012 | Ikeda et al. |
| 2013/0078385 A1 | 3/2013 | Hendricks, Sr. |
| 2013/0289165 A1 | 10/2013 | De Landtsheer et al. |
| 2014/0020809 A1 | 1/2014 | Yokokura et al. |
| 2014/0041578 A1 | 2/2014 | Hendricks, Sr. |
| 2014/0242280 A1 | 8/2014 | Swarup et al. |
| 2014/0272419 A1 | 9/2014 | Furar et al. |
| 2014/0377468 A1 | 12/2014 | Swarup et al. |
| 2015/0045491 A1 | 2/2015 | Zhang et al. |
| 2015/0210883 A1 | 7/2015 | Swarup et al. |
| 2015/0267077 A1 | 9/2015 | Janoski, Sr. et al. |
| 2015/0307738 A1 | 10/2015 | Schmucker et al. |
| 2015/0368512 A1 | 12/2015 | Bowman et al. |
| 2016/0068706 A1 | 3/2016 | Swarup et al. |
| 2016/0152075 A1 | 6/2016 | Shibata |
| 2018/0230327 A1 | 8/2018 | Kanda |

FOREIGN PATENT DOCUMENTS

| | | |
|---|---|---|
| CN | 101240101 A | 8/2008 |
| CN | 101979255 A | 2/2011 |
| CN | 102181238 A | 9/2011 |
| CN | 102199254 A | 9/2011 |
| CN | 102492281 A | 6/2012 |
| CN | 102702953 A | 10/2012 |
| CN | 202621351 U | 12/2012 |
| CN | 103059703 A | 4/2013 |
| CN | 103485179 A | 1/2014 |
| CN | 203448247 U | 2/2014 |
| CN | 103846200 A | 6/2014 |
| CN | 103386863 B | 11/2015 |
| CN | 105038625 A | 11/2015 |
| CN | 103992765 A | 9/2016 |
| DE | 3016710 A1 | 11/1980 |
| DE | 3325896 A1 | 1/1985 |
| DE | 3416690 A1 | 1/1986 |
| EP | 0765922 | 9/1996 |
| EP | 1040875 B1 | 10/2000 |
| EP | 1454971 B1 | 9/2004 |
| EP | 1669411 A1 | 6/2006 |
| GB | 112332 A | 1/1918 |
| GB | 724054 A | 2/1955 |
| GB | 752655 A | 7/1956 |
| GB | 1567966 A | 5/1980 |
| JP | 6262851 A | 3/1987 |
| JP | 5320299 A | 12/1993 |
| JP | 5339542 A | 12/1993 |
| JP | 782456 A | 3/1995 |
| JP | 7188353 A | 7/1995 |
| JP | 7242855 A | 9/1995 |
| JP | 892533 A | 4/1996 |
| JP | 8309879 A | 11/1996 |
| JP | 10139839 A | 5/1998 |
| JP | 10259356 A | 9/1998 |
| JP | 10265735 A | 10/1998 |
| JP | 11501586 A | 2/1999 |
| JP | 2000345092 A | 12/2000 |
| JP | 200140272 A | 2/2001 |
| JP | 2001040319 A | 2/2001 |
| JP | 2001138459 A | 5/2001 |
| JP | 2001278923 A | 10/2001 |
| JP | 200288215 A | 3/2002 |
| JP | 2003306006 A | 10/2003 |
| JP | 2005264136 A | 9/2005 |
| JP | 200656973 A | 3/2006 |
| JP | 200784730 A | 4/2007 |
| JP | 20081779 A | 1/2008 |
| JP | 200813741 A | 1/2008 |
| JP | 201053340 A | 3/2010 |
| JP | 201126463 A | 2/2011 |
| JP | 201169020 A | 4/2011 |
| JP | 2010255153 A | 11/2011 |
| JP | 2012101611 A | 5/2012 |
| JP | 2012101612 A | 5/2012 |
| JP | 4953355 B2 | 6/2012 |
| JP | 5035742 B2 | 9/2012 |
| JP | 2012214928 A | 11/2012 |
| JP | 2014129484 A | 7/2014 |
| JP | 2014161832 A | 9/2014 |
| JP | 20156737 A | 1/2015 |
| JP | 5703108 B2 | 4/2015 |
| KR | 101098516 B1 | 12/2011 |
| KR | 101086454 B1 | 11/2015 |
| WO | 8501250 A1 | 3/1985 |
| WO | 9747401 A1 | 12/1997 |
| WO | 03089487 A1 | 10/2003 |
| WO | 2005105425 A2 | 11/2005 |
| WO | 2010015494 A2 | 2/2010 |
| WO | 2011127641 A1 | 10/2011 |
| WO | 2013/027093 | 2/2013 |
| WO | 2015030955 A1 | 3/2015 |
| WO | 2017038306 A1 | 3/2017 |
| WO | 2017/160398 | 9/2017 |
| WO | 2017/180220 | 10/2017 |
| WO | WO-2017180220 A1 * | 10/2017 ............... C09D 7/00 |

OTHER PUBLICATIONS

Erielev et al., "Synthesis and chemical modification of rubber latexes containing ketonic groups", Kauchuk i Rezina, 1973, vol. 32 (8), pp. 7-10.

(56) References Cited

OTHER PUBLICATIONS

Hirose et al., The structure and properties of core-shell type acryllic-polyurethane hybrid aqueous emulsions, Progress in Organic Coatings, 1997, vol. 31, pp. 157-169.

Jin, Jing et al. Better Rubber to Substrate Adhesion via Better Interfacial Chemistry, Fall 178th meeting of the Rubber Division of the American Chemical Society., 2010, 1-19, Paper #97, Milwaukee, WI.

Kessel et al. The diacetone acrylamide crosslinking reaction and its influence on the film formation of an acrylic latex, J. Coat. Technol. Res., 2008, vol. 5:3, pp. 285-297.

Navarro-Banon et al., "Water-based chlorination treatment of SBS rubber soles to improve their adhesion to waterborne polyurethane adhesives in the footwear industry." J. Adhesion Sci. Technol., Jun. 13, 2005, 947-974, 9:11.

Okamoto et al., Urethane/acrylic composite polymer emulsions, Progress in Organic Coatings, 1996, vol. 29, pp. 175-182.

Zhang et al., The Diacetone Acrylamide Crosslinking Reaction and Its Control of Core-Shell Polyacrylate Lactices at Ambient Temperature, Journal of Applied Polymer Science, 2012, vol. 123, pp. 1822-1832.

\* cited by examiner

COATING COMPOSITIONS, ELASTIC BARRIER COATINGS FORMED THEREFROM, AND METHODS OF APPLYING SUCH COATINGS

FIELD OF THE INVENTION

The present invention relates to coating compositions and elastic barrier coatings formed from the coating compositions.

BACKGROUND OF THE INVENTION

Barrier coatings are used in a variety of industries to reduce permeation of vapor, gas, and/or chemicals through a substrate. For instance, barrier coatings are typically applied to tires and to bladders of sporting equipment such as shoes and balls to reduce the ingress and egress of gas. While barrier coatings can reduce the permeation of vapor, gas, and/or chemicals, they are generally brittle at low temperatures such as at −40° C. and, therefore, have a negative effect on the elasticity of the substrate. It is also difficult to adhere such barrier coatings to substrates such as tires. For example, tires typically contain a silicone component as a mold release agent that interferes with the adhesion between the barrier coating and the surface of the tire.

Thus, it is desirable to develop improved coatings that provide good elasticity and gas barrier performance at both high and low temperatures, and which also demonstrates good adhesion with the surface of substrates such as tires.

SUMMARY OF THE INVENTION

The present invention is directed to a coating composition that includes a polymer comprising (i) a barrier segment comprising aromatic groups and urethane linkages, urea linkages, or a combination thereof and (ii) an elastomeric segment that is different from (i). The barrier segment comprises at least 30 weight % of the polymer based on the total solids weight of the polymer. Further, the composition also includes an adhesion promoter comprising: (a) at least one epoxy functional polymer and a thiol functional crosslinker reactive with the epoxy functional polymer; and/or (b) a hydrazide functional component.

The present invention is also directed to a multi-layer elastic barrier coating comprising: (a) an adhesive coating layer to be applied over at least a portion of a substrate; and (b) an elastic barrier coating applied over at least a portion of the adhesive coating layer. The adhesive coating layer is formed from a coating composition comprising at least one epoxy functional polymer and a thiol functional crosslinker reactive with the epoxy functional polymer. Further, the elastic barrier coating layer is formed from a coating composition comprising a polymer comprising (i) a barrier segment comprising aromatic groups and urethane linkages, urea linkages, or a combination thereof and (ii) an elastomeric segment that is different from (i). The barrier segment comprises at least 30 weight % of the polymer based on the total solids weight of the polymer.

The present invention further relates to a substrate at least partially coated with a coating formed from a coating composition according to the present invention or with the above-described multi-layer coating. It was found that the coatings of the present invention provide, low temperature elasticity, good oxygen/nitrogen gas barrier performance, and good adhesion to a substrate.

DESCRIPTION OF THE INVENTION

Figure 1:
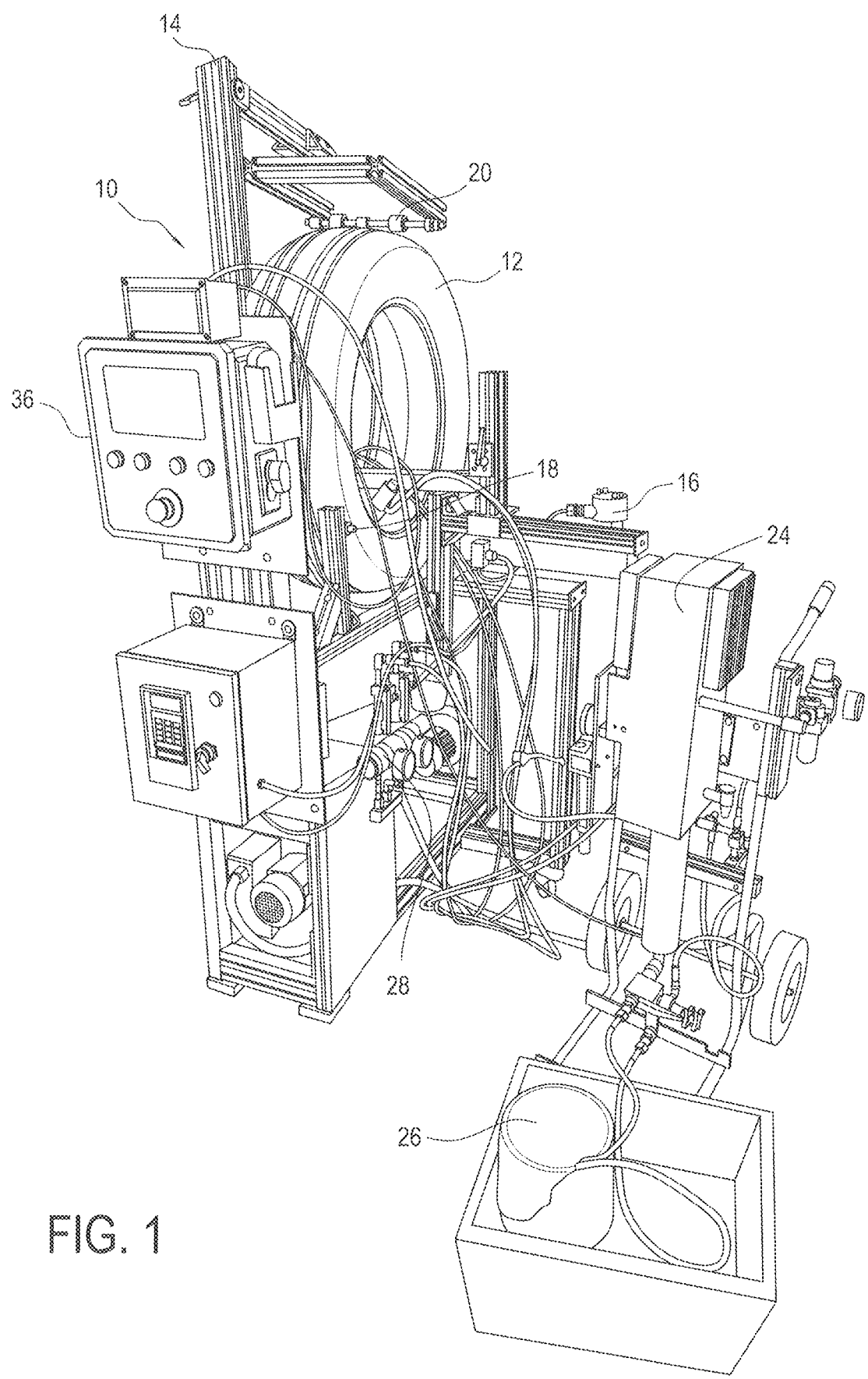
FIG. 1 is a perspective view of a device for spraying a coating composition to a passenger tire according to the present invention.

The present invention relates to a coating composition that includes: (a) a polymer comprising a barrier segment and an elastomeric segment (also referred to herein as the "first polymer"); and (b) an adhesion promoter. As used herein, a "polymer" refers to oligomers and homopolymers (e.g., prepared from a single monomer species), copolymers (e.g., prepared from at least two monomer species), and graft polymers. The term "resin" is used interchangeably with the term "polymer."

Further, the term "barrier segment", with respect to a polymer, refers to a section or sections on the backbone of a polymer that imparts a vapor barrier, gas barrier, and/or chemical barrier to a substrate when used in a coating that is applied over the substrate. "Vapor barrier" refers to a barrier and/or low permeability to liquid and/or its vapor. "Gas barrier" refers to a barrier and/or low permeability to oxygen, nitrogen, argon, carbon dioxide, and/or other gases. "Chemical barrier" refers to a barrier and/or low permeability to the migration of a molecule from one substrate to another, and/or from within a substrate, e.g. from its interior to its surface or vice versa. Any resistance to permeation of vapor, gas, and/or chemical(s) is sufficient to qualify a coating as a "barrier coating" according to the present invention.

The gas barrier properties of a substrate, and/or any coatings thereon, are typically described in terms of the oxygen permeance ("P(O$_2$)"). The "P(O$_2$)" number quantifies the amount of oxygen that can pass through a substrate and/or coating under a specific set of conditions and is generally expressed in units of cc·mm/m$^2$·day·atm. This is a standard unit of permeation measured as cubic centimeters of oxygen permeating through one millimeter thickness of a sample, of an area of a square meter, over a 24 hour period, under a partial pressure differential of one atmosphere at 23° C. and 50% relative humidity (R.H.) conditions.

The barrier segment(s) of the polymer contained in the coating composition according to the present invention generally comprise(s) aromatic groups as well as urethane linkages, urea linkages, or combinations thereof. In some examples, the polymer is a polyurethane based polymer comprising aromatic groups, urethane linkages and, optionally, urea linkages that form the barrier segment(s) and additional different segment(s) that form the elastomeric segment(s). The polyurethane based polymer can be formed according to any method known in the art, such as by reacting at least one polyisocyanate with one or more compound(s) having functional groups that are reactive with the isocyanate functionality of the polyisocyanate. Reactive functional groups can be active hydrogen-containing functional groups such as hydroxyl groups, thiol groups, amine groups, and acid groups like carboxylic acid groups. A hydroxyl group may for example react with an isocyanate group to form a urethane linkage. A primary or secondary amine group may react with an isocyanate group to form a urea linkage. Generally the reaction mixture includes at least one hydroxyl-functional reactive compound such as a polyol for formation of urethane functionality. Typically the compound(s) having functional groups that are reactive with the isocyanate functionality of the polyisocyanate comprise at least one compound having two or more active hydrogen-containing functional groups, e.g. selected from those mentioned above, per molecule.

Non-limiting examples of such reactive compounds include polyols, compounds containing carboxylic acid groups including diols containing carboxylic acid groups, polyamines, polythiols, and/or other compounds having reactive functional groups, such as hydroxyl groups, thiol groups, amine groups, and carboxylic acids. In some examples, an aromatic polyisocyanate and/or an aromatic compound(s) having functional groups that are reactive with the isocyanate functionality of the polyisocyanate are used in the preparation of the polymer to introduce aromatic barrier segment(s) in the polyurethane polymer.

It is appreciated that polyamines and other art recognized compounds can be used as a chain extender. As used herein, a "chain extender" refers to a lower molecular weight compound having two or more functional groups that are reactive towards isocyanate functional compounds.

Polyisocyanates that can be used in the preparation of the polymer having barrier and elastomeric segments include aliphatic and aromatic diisocyanates as well as higher functional polyisocyanates. Non-limiting examples of suitable polyisocyanates include isophorone diisocyanate (IPDI), dicyclohexylmethane 4,4'-diisocyanate (H12MDI), cyclohexyl diisocyanate (CHDI), m-tetramethylxylylene diisocyanate (m-TMXDI), p-tetramethylxylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate (TDI), m-xylylenediisocyanate (MXDI) and p-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, and mixtures or combinations thereof. For example, a polyisocyanate that comprises one or more aromatic group(s) such as toluene diisocyanate (TDI), m-xylylenediisocyanate (MXDI), p-xylylenediisocyanate, and/or 4,4'-dibenzyl diisocyanate can in particular be used in the preparation of the polymer to form aromatic barrier segment(s).

Examples of polyols that can be used to prepare the polyurethane based polymer include, but are not limited to, polyether polyols, polyester polyols, copolymers thereof, as well as other compounds that comprise two or more hydroxyl groups, and combinations of any of the foregoing. Non-limiting examples of suitable polyether polyols include polytetrahydrofuran, polyethylene glycol, polypropylene glycol, polybutylene glycol, copolymers thereof, and combinations thereof.

Non-limiting examples of polyester polyols include those prepared from a polyol such as a polyol comprising one or more of an ether moiety and a carboxylic acid or anhydride. Suitable polyols include, for example, ethylene glycol, oligomers of ethylene glycol (including diethylene glycol, triethylene glycol and tetraethylene glycol), propylene glycol, and oligomers of propylene glycol (including dipropylene glycol, tripropylene glycol, and tetrapropylene glycol).

Other suitable polyols include, but are not limited to, 1,6-hexanediol, cyclohexanedimethanol, 2-ethyl-1,6-hexanediol, 1,4-butanediol, 1,3-propanediol, 1,4-butanediol, neopentyl glycol, dihydroxyalkylated aromatic compounds such as the bis (2-hydroxyethyl) ethers of hydroquinone and resorcinol (HER) which is also referred to as 1,3-bis(2-hydroxyethoxy) benzene, p-xylene-α,α'-diol, the bis (2-hydroxyethyl) ether of p-xylene-α,α'-diol, m-xylene-α,α'-diol and the bis (2-hydroxyethyl) ether of m-xylene-α,α'-diol, trimethylol propane, 1,2,6-hexantriol, glycerol, and combinations thereof.

Suitable carboxylic acids, which can be reacted with the polyols to form a polyester polyol include, but are not limited to, glutaric acid, succinic acid, malonic acid, oxalic acid, phthalic acid, isophthalic acid, hexahydrophthalic acid, adipic acid, maleic acid, and mixtures thereof. Another non-limiting example of a suitable carboxylic acid is a furandicarboxylic acid such as 2,5-furandicarboxylic acid, which can be reacted with an excess of polyols to form polyols containing furan-diester moieties. Anhydrides of these and any other carboxylic acids can also be used.

Furthermore, suitable carboxylic acid group containing diols that can be used with the present invention include, but are not limited to, 2,2-bis(hydroxymethyl)propionic acid which is also referred to as dimethylolpropionic acid (DMPA), 2,2-bis(hydroxymethyl)butyric acid which is also referred to as dimethylol butanoic acid (DMBA), diphenolic acid, and combinations thereof.

Suitable polyamines that can be used to prepare the polyurethane based polymer include aliphatic and aromatic compounds, which comprise two or more amine groups selected from primary and secondary amine groups. Examples include, but are not limited to, ethylenediamine, hexamethylenediamine, 1,2-propanediamine, 2-methyl-1,5-penta-methylenediamine, 2,2,4-trimethyl-1,6-hexanediamine, isophoronediamine, diaminocyclohexane, xylylenediamine, 1,12-diamino-4,9-dioxadodecane, p-phenylenediamine, m-phenylenediamine, benzidine, 4,4'-methylenedianiline, 4,4'-methylene bis (2-chloroaniline), and combinations thereof.

Suitable amino alcohols that can be used to prepare the urethane linkages and/or urea linkages containing polymer include, but are not limited to, ethanolamine, propanolamine, butanolamine, and combinations thereof.

As previously described, the polymer comprises aromatic groups which have been found to increase the barrier properties of a coating formed from a coating composition of the present invention including the polymer. As used herein, the term "aromatic" refers to a cyclically conjugated moiety with a stability (due to a delocalization of electrons) that is significantly greater than that of a hypothetical localized structure. The aromatic ring can include aromatic carbocyclic or heteroaromatic ring structures. An "aromatic carbocyclic ring" refers to an aromatic ring with the aromatic group completely formed by bonded carbon atoms, and a "heteroaromatic ring" refers to an aromatic ring with at least one carbon atom of the aromatic group replaced by a heteroatom such as nitrogen, oxygen, sulfur, or a combination thereof. The aromatic groups can be incorporated into the final polymer through any of the previously described components used to form the polymer. For example, aromatic groups can be introduced into the backbone of the final polymer with: hydroxyl containing compounds having aromatic groups such as bis(2-hydroxyethyl)ethers of hydroquinone resorcinol (HER) and diols containing furan rings; polyisocyanates having aromatic groups such as tetramethylxylylene diisocyanates or TDI; polyamines having aromatic groups such as xylylene diamines; and combinations thereof. In some examples, the first polymer is a polyurethane based polymer having aromatic groups and which is prepared from a reaction mixture comprising (i) an aromatic diisocyanate and (ii) an aliphatic polyester polyol or an aliphatic polyether polyol, and (iii) optional further components such as aromatic or aliphatic polyol components including carboxyl-functional diols, and/or polyamines.

Further, the aromatic groups incorporated into the polymer can comprise a six-membered aromatic ring that is substituted at any position such as the ortho, meta, and/or para position. For example, the aromatic groups used to form the polymer can comprise a meta substituted six-membered aromatic ring. Non-limiting examples of meta substituted six membered aromatic rings include bis(2-hydroxyethyl)ethers of hydroquinone resorcinol (HER), tetramethylxylylene diisocyanate, and m-xvlylenediamine. It is appreciated that the aromatic groups incorporated into the polymer are not limited to six-membered rings and can be selected from other membered rings including, but not limited to, five-membered aromatic rings such as furan containing compounds as previously described.

The previously described polymer used in the coating composition according to the present invention can comprise at least 10 weight %, at least 20 weight %, or at least 30 weight % of structural units derived from aromatic monomers, based on the total solids weight of the polymer. For example, the polymer can comprise at least 10 weight %, at least 20 weight %, or at least 30 weight % of structural units derived from meta-substituted aromatic monomers. The percent of structural units derived from aromatic monomers in the polymer can be determined, for example, by adding the weight of all the monomers containing one or more aromatic groups such as a meta-substituted aromatic group, dividing that number by the total solid weight of the final resin and multiplying by 100. For example, for a polymer made from 200 g of bis(2-hydroxyethyl)ether of hydroquinone resorcinol (HER), 250 g of tetramethylxylylene diisocyanate, and 550 g of a polyether polyol, add the weights of the two aromatic monomers (200 g plus 250 g), divide by the total weight (1000 g), and multiply by 100 to obtain 45 weight % of structural units derived from aromatic monomers.

Any combination of the previously described components can be used to form the barrier segment(s) of the polymer. For example, polyols (such as 1,3-bis(2-hydroxyethoxy) benzene) can be reacted with polyisocyanates (such as TDI) to form urethane linkages and polyamines (such as m-xvlylenediamine) can be reacted with polyisocyanates to form urea linkages. It is appreciated one or more of the polyols, polyisocyanates, and/or polyamines can provide aromatic groups to the polyurethane. It is further appreciated that a component such as a polyol that contributes to the formation of the barrier segments can also provide the elastomeric segments of the final polymer. For instance, a polyol can be reacted with an isocyanate to form urethane moieties (as part of the barrier segment) while the remaining residual moiety (e.g. the polyether or polyester backbone) forms an elastomeric segment.

The barrier segment of the final polymer can have a glass transition temperature ($T_g$) of greater than 0° C., such as greater than 10° C., or greater than 20° C. The glass transition temperature ($T_g$) is determined by dynamic mechanical analysis using a model QA800 Dynamic Mechanical Analysis made by TA Instruments (New Castle, Del.) using the following parameters: mode: tension film, amplitude: 20 µm, frequency: 1 Hz, clamping force: 15 cNm, temperature cycle: −100° C. to 175° C., heating rate: 3° C./min., sample dimensions: 15.0 length×~6.5 width (mm). The peaks of the Tan Delta curves provide the Tg's of the different segments by taking in consideration the known peaks of the materials forming the barrier segments and the materials forming the elastomeric segments.

Further, the barrier segment(s) can comprise at least 30 weight % or at least 40 weight % of the first polymer, based on the total solids weight of the polymer. The barrier segment(s) can also comprise up to 70 weight % or up to 60 weight % of the first polymer, based on the total solids weight of the polymer. The polymer may for example comprise the barrier segment(s) in an amount of from 30 weight % to 70 weight % or from 40 weight % to 60 weight %, based on the total solids weight of the polymer.

As indicated, the first polymer also includes one or more elastomeric segment(s). The term "elastomeric segment", with respect to a polymer, refers to a section or sections on the backbone of a polymer that imparts a degree of elasticity, for example a degree of elasticity that is higher than that of the barrier segment in the polymer and which helps provide the elastomeric properties in a coating formed from a coating composition containing the polymer such as when a coating formed from a coating composition containing the polymer is applied over a substrate. "Elastomeric" and like terms as used herein refer to materials that impart elasticity. "Elasticity" and like terms refer to the ability of a material to return to its approximate original shape or volume after the material has been deformed, such as for example stretched.

The elastomeric properties of a substrate, and/or any coatings thereon, are typically described in terms of the elongation at break. "Elongation at break" and like terms refer to the amount of elongation a substrate or coating can withstand prior to breaking or cracking. Elongation at break is determined with an INSTRON® model 4443 SFL unit with a temperature controlled test chamber (commercially available from Instron Corp.). The test rate for elongation at break measurements at −40° C. is run at 5 mm/minute and the test rate for elongation at break measurements at room temperature (i.e., 20° C. to 25° C.) is run at 50 mm/minute.

The elastomeric segment(s) of the polymer are different from the barrier segment(s). For example, the elastomeric segment(s) can be non-aromatic and/or be free of urethane and/or urea linkages. The elastomeric segment(s) can, for example, comprise ester linkages, ether linkages, sulfide linkages, natural rubber, synthetic rubber, or combinations thereof. For example, the elastomeric segment(s) of the polymer can be formed by ester linkages from a polyester, ether linkages from a polyether, sulfide linkages from a polysulfide, rubber based polymers, copolymers thereof, or combinations thereof.

Non-limiting examples of polyethers and polyesters suitable for forming the elastomeric segment(s) include any of the polyethers and polyesters previously described such as in particular polyether polyol and polyester polyol materials. Non-limiting examples of suitable polysulfides are commercially available under the trade name THIOPLAST®, a liquid polysulfide polymer, supplied by Akzo Nobel, Greiz, Germany. Other suitable polysulfides can include polysulfides described in "Sealants" by Adolfas Damusis, Reinhold Publishing Corp., 1967, at pages 175-195, which is incorporated by reference herein. Suitable Polysulfides, which can be used in the preparation of the first polymer for formation of the elastomeric segment(s), are also described in U.S. Patent Application Publication No. 2015/0368512 at paragraphs [0025] to [0030], which is incorporated by reference herein. It is further appreciated that the elastomeric segments can be formed from a compound having two or more active hydrogen containing groups, such as hydroxyl, amino, and/or thiol groups, that react with isocyanate functionality and which the compound further comprises linkages selected from ether, ester, thioether, (poly)sulfide linkages, and combinations thereof that provide the elastomeric segment(s).

Non-limiting examples of rubber based polymers, which can be used in the preparation of the first polymer for formation of the elastomeric segment(s), include cis-1,4-polyisoprene rubber, styrene/butadiene copolymers, polybutadiene rubber, styrene/isoprene/butadiene rubber, butyl rubber, halobutyl rubber, and combinations thereof.

The elastomeric segment(s) of the final polymer can have a glass transition temperature ($T_g$) of less than 0° C., less than −20° C., or less than −50° C. The glass transition temperature ($T_g$) is determined by dynamic mechanical analysis with a model QA800 Dynamic Mechanical Analysis made by TA Instruments (New Castle, Del.) as previously described.

Further, the elastomeric segment(s) can comprise at least 30 weight % or at least 40 weight % of the polymer, based on the total solids weight of the polymer. The elastomeric segment(s) can also comprise up to 70 weight % or up to 60 weight % of the polymer, based on the total solids weight of the polymer. The polymer may, for example, comprise the elastomeric segment(s) in an amount of from 30 weight % to 70 weight % or from 40 weight % to 60 weight %, based on the total solids weight of the polymer.

The polymer comprising barrier and elastomeric segments can be prepared by reacting any of the previously described components that form the barrier and elastomeric segments. For example, the polymer can be prepared by reacting a polyester or polyether polyol, other hydroxyl containing compounds such as 1,3-bis(2-hydroxyethoxy) benzene, a polyisocyanate, acid containing diols such as dimethylolpropionic acid (DMPA), and, optionally, diamine compounds. Such polymers can have barrier segment(s) comprising aromatic groups, urethane linkages, and optionally urea linkages as well as elastomeric segment(s) comprising the ester or ether linkages.

The polymer can also have a particular polymer architecture. For example, the first polymer comprising barrier and elastomeric segments can have a linear random copolymer architecture or a linear block copolymer architecture. As used herein, a "random copolymer" refers to a polymer with multiple monomer units arranged in an irregular, random order. A "block copolymer" refers to a polymer with multiple sequences, or blocks, of the same monomer alternating in series with at least another block having different monomers. The block copolymer can be a diblock copolymer (copolymer with two types of blocks), a triblock copolymer (copolymer with three types of blocks), a multiblock copolymer (copolymer with four or more types of blocks), and combinations thereof. In some examples, the polymer is a block copolymer comprising: at least one block having aromatic groups and urethane linkages, urea linkages, or a combination thereof; and at least a second different block having ester linkages, ether linkages, or a combination thereof.

Further, the polymer comprising barrier and elastomeric segments can comprise one or more, such as two or more, reactive functional groups. The term "reactive functional group" refers to an atom, group of atoms, functionality, or group having sufficient reactivity to form at least one covalent bond with another reactive group in a chemical reaction. Non-limiting examples of reactive functional groups include carboxylic acid groups, keto functional groups (also referred to as ketone functional groups), aldo functional groups (also referred to as aldehyde functional groups), amine groups, epoxide groups, hydroxyl groups, thiol groups, carbamate groups, amide groups, urea groups, isocyanate groups (including blocked isocyanate groups), ethylenically unsaturated groups, and combinations thereof. As used herein, "ethylenically unsaturated" refers to a group having at least one carbon-carbon double bond. Non-limiting examples of ethylenically unsaturated groups include, but are not limited to, (meth)acrylate groups, vinyl groups, and combinations thereof. As used herein, the term "(meth)acrylate" refers to both the methacrylate and the acrylate.

It is appreciated that the polymer comprising barrier and elastomeric segments can also be free of (i.e., does not contain) any of the previously described reactive functional groups. For example, the polymer comprising barrier and elastomeric segments can be free of ethylenically unsaturated reactive groups such as (meth)acrylate groups.

The previously described polymer can be dispersed in an aqueous medium to form a dispersion. The polymer dispersion is then combined with other components to form the coating composition. The polymer can be dispersed or dissolved in an aqueous carrier medium of the coating composition of the present invention. As used herein, the term "aqueous" refers to a liquid medium, e.g. the aqueous carrier medium of the coating composition of the present invention, comprising at least 50 weight % water, based on the total weight of the liquid medium. Such aqueous liquid mediums can for example comprise at least 60 weight % water, or at least 70 weight % water, or at least 80 weight % water, or at least 90 weight % water, or at least 95% water, based on the total weight of the liquid medium. The aqueous medium optionally comprises one or more organic solvent(s) that make up less than 50 weight % of the liquid medium including organic solvents. Non-limiting examples of suitable organic solvents include polar organic solvents, e.g. protic organic solvents such as glycols, glycol ether alcohols, alcohols; and volatile ketones, glycol diethers, esters, and diesters. Other non-limiting examples of organic solvents include aromatic and aliphatic hydrocarbons.

In order to enhance water-dispersibility and stability of the polymer in the aqueous medium, the polymer can comprise water-dispersible groups such as hydrophilic groups. For example, the polymer can comprise carboxylic acid functional groups, such as by using carboxylic acid groups containing diols to form the first polymer. The carboxylic acid functional groups can be at least partially neutralized (i.e., at least 30 percent of the total neutralization equivalent) by an inorganic base, such as a volatile amine, to form a salt group. A volatile amine refers as an amine compound having an initial boiling point of less than or equal to 250° C. as measured at a standard atmospheric pressure of 101.3 kPa.

Non-limiting examples of suitable amines are ammonia, dimethylamine, trimethylamine, monoethanolamine, and dimethylethanolamine. It is appreciated that the amines will evaporate during the formation of the coating to expose the carboxylic acid functional groups and allow the carboxylic acid functional groups to undergo further reactions such as with a crosslinking agent reactive with the carboxylic acid functional groups. Other non-limiting examples of water-dispersible groups include polyoxyalkylene groups.

The polymer having barrier and elastomeric segments can comprise a weight average molecular weight of at least 5,000 g/mol, at least 10,000 g/mol, at least 15,000 g/mol, or at least 20,000 g/mol. The weight average molecular weight is determined by gel permeation chromatography relative to linear polystyrene standards of 800 to 900,000 Da using a Waters 2695 separation module with a Waters 2414 differential refractometer (RI detector) and with tetrahydrofuran (THF) used as the eluent at a flow rate of 1 ml min-1. Two PLgel Mixed-C (300×7.5 mm) columns are used for separation.

Other non-limiting examples of polyurethane based dispersions that can be used are described in U.S. Pat. No. 8,716,402 at column 2, line 13 to column 4, line 33, which is incorporated by reference herein.

The coating composition according to the present invention can comprise the polymer having barrier and elastomeric segments in an amount of at least 20 weight %, such as at least 30 weight %, at least 40 weight %, such as at least 50 weight %, or at least 60 weight %, based on the total solids weight of the coating composition. The coating composition according to the present invention can comprise the polymer having barrier and elastomeric segments in an amount of up to 90 weight %, such as up to 80 weight %, or up to 70 weight %, based on the total solids weight of the coating composition. The coating composition of the present invention may for example comprise the polymer having barrier and elastomeric segments in an amount of from 20 to 90 weight %, or from 50 to 80 weight %, or from 55 to 80 weight %, or from 50 to 70 weight %, or from 55 to 70 weight %, based on the total solids weight of the coating composition.

As previously described, the coating composition also includes an adhesion promoter. As used herein, an "adhesion promoter" refers to a component or group of components, such as monomers, polymers, or combinations thereof for example, that increase the adhesion of a coating layer to a substrate. The adhesion promoter used in the coating compositions according to the present invention can include, but is not limited to, (a) at least one epoxy functional polymer and a thiol functional crosslinker reactive with the epoxy functional polymer, (b) a hydrazide functional component, or (c) a combination of (a) and (b).

The epoxy functional polymer can include various types of polymers provided that the polymer comprises two or more epoxy functional groups per molecule. Non-limiting examples of such polymers include epoxy-functional polyurethanes, (meth)acrylate polymers, polyester polymers, polyamide polymers, polyether polymers, copolymers thereof, and mixtures thereof. Suitable epoxy functional polymers also include, but are not limited to, polyglycidyl ethers of Bisphenol A, such as EPON® 828 and 1001 epoxy resins, and Bisphenol F diepoxides, such as EPON® 862, which are commercially available from Hexion Specialty Chemicals, Inc. Other suitable epoxy functional polymers include, but are not limited to, polyglycidyl ethers of polyhydric alcohols, polyglycidyl esters of polycarboxylic acids, polymers that are derived from the epoxidation of an olefinically unsaturated alicyclic compound, polymers containing oxyalkylene groups in the epoxy molecule, and epoxy novolac resins. Still other suitable epoxy-containing compounds include epoxidized Bisphenol A novolacs, epoxidized phenolic novolacs, epoxidized cresylic novolac, and triglycidyl p-aminophenol bismaleimide. The epoxy-containing compound may also comprise an epoxy-dimer acid adduct. The epoxy-dimer acid adduct may be formed as the reaction product of reactants comprising a diepoxy functional compound (such as a polyglycidyl ether of Bisphenol A) and a dimer acid (such as a C36 dimer acid). The epoxy-containing compound may also comprise a carboxyl-terminated butadiene-acrylonitrile copolymer modified epoxy-containing compound.

The epoxy functional compound may also comprise an epoxy-adduct. As used herein, the term "epoxy-adduct" refers to a reaction product comprising the residue of an epoxy compound and at least one other compound that does not include an epoxy functional group. For example, the epoxy-adduct may comprise the reaction product of reactants comprising: (1) an epoxy compound, a polyol, and an anhydride; (2) an epoxy compound, a polyol, and a diacid; or (3) an epoxy compound, a polyol, an anhydride, and a diacid. The epoxy functional compound used to form the epoxy-adduct may comprise any of the epoxy-containing compounds previously described.

Moreover, the polyol that can be used to form the epoxy-adduct may include diols, triols, tetraols and higher functional polyols. Suitable polyols may also include polyether polyols, polyurethane polyols, polyurea polyols, acrylic polyols, polyester polyols, polybutadiene polyols, hydrogenated polybutadiene polyols, polycarbonate polyols, polysiloxane polyols, and combinations thereof. Polyamines corresponding to polyols may also be used, and in this case, amides instead of carboxylic esters will be formed with the diacids and anhydrides. The polyol may also include lactone based polyesters. As used herein, a "lactone" refers to a cyclic ester in which the oxygen and carbonyl atoms of the ester group are part of the ring backbone. A "lactone based polyester" refers to a polyester formed by ring-opening polymerization lactones with a one or more additional compounds such as hydroxyl functional compounds. The term "lactone based polyester" is also referred to herein as a "polylactone".

Non-limiting examples of suitable lactones that can be used to prepare the polyester include ε-caprolactone, β-propiolactone, γ-butyrolactone, δ-valerolactone, and combinations thereof. Further, the hydroxyl functional compounds that are reacted with the lactones include compounds comprising two or more such as three or more, or four more, hydroxyl groups. Non-limiting examples of suitable hydroxyl containing compounds include ethylene glycol, propanediols, butanediols, pentanediols, hexanediols, heptanediols, trimethylolpropane, trimethylolethane, 1,2,5-hexanetriol, polyether triols, di-trimethylol propane, pentaerythritol, dipentaerythritol, trimethylol butane, glycerol, and combinations thereof.

In some examples, the polyol comprises a polycaprolactone-based polyester polyol. The polycaprolactone-based polyol may comprise diols, triols or tetraols terminated with primary hydroxyl groups. Commercially available polycaprolactone-based polyols include those sold under the trade name Capa™ from Perstorp Group, such as, for example, Capa™ 2054, Capa™ 2077A, Capa™ 2085, Capa™ 2205, Capa™ 3031, Capa™ 3050, Capa™ 3091 and Capa™ 4101.

The polyol may also comprise a polytetrahydrofuran-based polyol. The polytetrahydrofuran-based polyols may comprise diols, triols or tetraols terminated with primary hydroxyl groups. Commercially available polytetrahydrofuran-based polyols include those sold under the trade name Terathane®, such as Terathane® 250 and Terathane® 650, available from Invista. In addition, polyols based on dimer diols sold under the trade names Pripol®, Solvermol™ and Empol®, available from Cognis Corporation, or bio-based polyols, such as the tetrafunctional polyol Agrol 4.0, available from BioBased Technologies, may also be utilized.

According to the present invention, the anhydride that may be used to form the epoxy-adduct may comprise any suitable acid anhydride known in the art. For example, the anhydride may comprise hexahydrophthalic anhydride and its derivatives (e.g., methyl hexahydrophthalic anhydride); phthalic anhydride and its derivatives (e.g., methyl phthalic anhydride); maleic anhydride; succinic anhydride; trimelletic anhydride; pyromelletic dianhydride (PMDA); 3,3',4,4'-oxydiphthalic dianhydride (ODPA); 3,3',4,4'-benzopherone tetracarboxylic dianhydride (BTDA); and 4,4'-diphthalic (hexafluoroisopropylidene) anhydride (6FDA).

According to the present invention, the diacid that may be used to form the epoxy-adduct may comprise any suitable diacid known in the art. For example, the diacids may comprise phthalic acid and its derivates (e.g., methyl phthalic acid), hexahydrophthalic acid and its derivatives (e.g., methyl hexahydrophthalic acid), maleic acid, succinic acid, adipic acid, and the like.

According to the present invention, the epoxy-adduct can also be prepared for example from reactants comprising a diol, a monoanhydride or a diacid, and a diepoxy compound, wherein the mole ratio of diol, monoanhydride (or diacid), and diepoxy compounds in the epoxy-adduct may vary from 0.5:0.8:1.0 to 0.5:1.0:6.0.

Further, according to the present invention, the epoxy-adduct can also be prepared for example with reactants comprising a tetraol, a monoanhydride or a diacid, and a diepoxy compound, wherein the mole ratio of tetraol, monoanhydride (or diacid), and diepoxy compounds in the epoxy-adduct may vary from 0.5:0.8:1.0 to 0.5:1.0:6.0.

It is appreciated that the epoxy functional polymers, such as the epoxy-adducts, can include additional functional groups as well. The additional functional groups can include any of the functional groups previously described such as hydroxyl groups. The epoxy functional polymers can also include aromatic groups, aliphatic cyclic groups, or combinations thereof. For example, the adhesion promoter can include a lactone based polyester comprising epoxy functional groups, hydroxyl functional groups, aromatic groups, and aliphatic cyclic groups.

The adhesion promoter can also comprise epoxy functional polymers mixed with rubber particles such as core-shell rubber particles dispersed in liquid epoxy resins for example. Suitable core-shell rubber particles may be comprised of butadiene rubber or other synthetic rubbers, such as styrene-butadiene and acrylonitrile-butadiene and the like. The average particle size of the rubber particles may be from 0.02 to 500 microns (20 nm to 500,000 nm), for example, the reported particle size for rubber particles provided by Kanekea Texas Corporation, as measured by standard techniques known in the industry, such as, for example, according to ISO 13320 and ISO 22412.

Exemplary non-limiting commercial core-shell rubber particle products using poly(butadiene) rubber particles that may be utilized include a core-shell poly(butadiene) rubber dispersion (25% rubber by weight) in bisphenol F diglycidyl ether (commercially available as KANE ACE® MX 136), a core-shell poly(butadiene) rubber dispersion (33% rubber by weight) in EPON® 828 (commercially available as KANE ACE® MX 153), a core-shell poly(butadiene) rubber dispersion (37% rubber by weight) in bisphenol A diglycidyl ether (commercially available as KANE ACE® MX 257), and a core-shell poly(butadiene) rubber dispersion (37% rubber by weight) in bisphenol F diglycidyl ether (commercially available as KANE ACE® MX 267), each available from Kaneka Texas Corporation.

Exemplary non-limiting commercial core-shell rubber particle products using styrene-butadiene rubber particles that may be utilized in the first component include a core-shell styrene-butadiene rubber dispersion (33% rubber by weight) in low viscosity bisphenol A diglycidyl ether (commercially available as KANE ACE® MX 113), a core-shell styrene-butadiene rubber dispersion (25% rubber by weight) in bisphenol A diglycidyl ether (commercially available as Kane Ace MX 125), a core-shell styrene-butadiene rubber dispersion (25% rubber by weight) in D.E.N.TM-438 phenolic novolac epoxy (commercially available as KANE ACE® MX 215), a core-shell styrene-butadiene rubber dispersion (25% rubber by weight) in Araldite® MY-721 multi-functional epoxy (commercially available as KANE ACE® MX 416), a core-shell styrene-butadiene rubber dispersion (25% rubber by weight) in MY-0510 multi-functional epoxy (commercially available as KANE ACE® MX 451), a core-shell styrene-butadiene rubber dispersion (25% rubber by weight) in Syna Epoxy 21 Cyclo-aliphatic Epoxy from Synasia (commercially available as Kane Ace MX 551), and a core-shell styrene-butadiene rubber dispersion (25% rubber by weight) in polypropylene glycol (MW 400) (commercially available as KANE ACE® MX 715), each available from Kaneka Texas Corporation.

It is appreciated that the adhesion promoter of the present invention can include one or multiple polymers that independently comprise two or more epoxy functional groups per molecule and which are the same or different from each other. For instance, the adhesion promoter can comprise at least one, at least two, or all three of the following: (1) a polymer, such as a polyester, comprising two epoxy functional groups per molecule and, optionally, hydroxyl functional groups, aromatic groups, and aliphatic cyclic groups; (2) a polymer, such as a polyester, comprising greater than two epoxy functional groups per molecule such as at least four epoxy functional groups per molecule and, optionally, hydroxyl functional groups, aromatic groups, and aliphatic cyclic groups; and (3) core shell rubber particles dispersed in an epoxy resin, such as an epoxy resin based on bisphenol-A. Thus, the adhesion promoter can comprise: only one of (1), (2), or (3); a combination of (1) and (2), (1) and (3), or (2) and (3); or a combination of all of (1), (2), and (3).

As indicated, the at least one epoxy-functional polymer is combined with a thiol functional crosslinker reactive with the epoxy functional groups for use as an adhesion promoter according to the present invention. As used herein, the term "crosslinker" refers to a molecule comprising two or more functional groups that are reactive with other functional groups and which is capable of linking two or more monomers or polymer molecules through chemical bonds. The thiol functional crosslinker comprises a compound having two or more thiol functional groups such as at least three thiol functional groups or at least four thiol functional groups. The at least one epoxy-functional polymer and the thiol functional crosslinker can be dispersed in a separate aqueous medium before being mixed with the additional components of the coating composition.

Non-limiting examples of a dithiol functional crosslinker include 3,6-dioxa-1,8-octanedithiol (DMDO), 3-oxa-1,5-pentanedithiol, 1,2-ethanedithiol T, 1,3-propanedithiol, 1,2-propanedithiol, 1,4-butanedithiol, 1,3-butanedithiol, 2,3-butanedithiol, 1,5-pentanedithiol, 1,3-pentanedithiol, 1,6-hexanedithiol, 1,3-dithio-3-methylbutane, ethylcyclohexyldithiol (ECHDT), methylcyclohexyldithiol, methyl-substituted dimercaptodiethyl sulfide, dimethyl-substituted dimercaptodiethyl sulfide, 2,3-dimercapto-1-propanol, bis-(4-mercaptomethylphenyl) ether, 2,2'-thiodiethanethiol, and glycol dimercaptoacetate (commercially available as THIOCURE® GDMA from BRUNO BOCK Chemische Fabrik GmbH & Co. KG).

Non-limiting examples of a trithiol functional crosslinker include trimethylpropane trimercaptoacetate (commercially available as THIOCURE® TMPMA from BRUNO BOCK Chemische Fabrik GmbH & Co. KG), trimethylopropane tris-3-mercaptopropionate (commercially available as THIOCURE® TMPMP from BRUNO BOCK Chemische Fabrik GmbH & Co. KG), ethoxylated trimethylpropane tris-3-mercaptopropionate polymer (commercially available as THIOCURE® ETTMP from BRUNO BOCK Chemische Fabrik GmbH & Co. KG), tris[2-(3-mercaptopropionyloxy) ethyl]isocyanurate (commercially available as THIOCURE® TEMPIC from BRUNO BOCK Chemische Fabrik GmbH & Co. KG).

Non-limiting examples of a tetrathiol functional crosslinker includes pentaerythritol tetramercaptoacetate (commercially available as THIOCURE® PETMA from BRUNO BOCK Chemische Fabrik GmbH & Co. KG), pentaerythritol tetra-3-mercaptopropionate (commercially available as THIOCURE® PETMP from BRUNO BOCK Chemische Fabrik GmbH & Co. KG), and polycaprolactone tetra(3-mercaptopropionate) (commercially available as THIOCURE® PCL4MP 1350 from BRUNO BOCK Chemische Fabrik GmbH & Co. KG). Higher functional polythiol crosslinkers may include dipentaerythritol hexa-3-mercaptopropionate (commercially available as THIOCURE® DiPETMP from BRUNO BOCK Chemische Fabrik GmbH & Co. KG).

The thiol functional crosslinker that can be used to form an adhesion promoter according to the present invention may also comprise a mercaptan terminated polysulfide. Commercially available mercaptan terminated polysulfides includes those sold under the trade name THIOLKOL® LP from Torray Fine Chemicals Co., Ltd., including LP-3, LP-33, LP-23, LP-980, LP-2, LP-32, LP-12, LP-31, LP-55 and LP-56. Other commercially available mercaptan terminated polysulfides include those sold under the trade name THIOPLAST® G™ from AkzoNobel Functional Chemicals GmbH, including G 10, G 112, G 131, G 1, G 12, G 21, G 22, G 44 and G 4.

According to the present invention the thiol functional crosslinker may also comprise a mercaptan terminated polyether. Commercially available mercaptan terminated polyether include for example QE-340M available from Torray Fine Chemicals Co., Ltd.

The epoxy functional polymer(s) and the thiol functional crosslinker(s) can be combined, e.g. mixed together, to provide a desired equivalent ratio of epoxy functional groups to thiol functional groups. For example, the epoxy functional polymer(s) and the thiol functional crosslinker(s) can be combined in suitable amounts to provide an equivalent ratio of epoxy functional groups to thiol functional groups in a range of from 0.03:1 to 2:1, such as from 0.1:1 to 1.5:1, or from 0.6:1 to 1.2:1, or from 0.8:1 to 1.2:1, or from 0.9:1 to 1.1:1 or being about 1.1:1.

As previously described, the adhesion promoter can also comprise, alternatively to or in addition to the epoxy functional polymer(s) and the thiol functional crosslinker(s), a hydrazide functional component. The hydrazide component used with the present invention typically comprises a material or compound having two or more hydrazide functional groups per molecule. The hydrazide component can be chosen from non-polymeric polyhydrazides, polymeric polyhydrazides, or combinations thereof. Non-limiting examples of suitable non-polymeric polyhydrazides include maleic acid dihydrazide, fumaric acid dihydrazide, itaconic acid dihydrazide, phthalic acid dihydrazide, isophthalic acid dihydrazide, terephthalic acid dihydrazide, trimellitic acid trihydrazide, oxalic acid dihydrazide, adipic acid dihydrazide, sebacic acid dihydrazide, and combinations thereof.

The polymeric polyhydrazides can include various types of polymers comprising two or more hydrazide functional groups. For example, the polymeric polyhydrazide can comprise a polyurethane having two or more hydrazide groups. The polyhydrazide functional polyurethane can be prepared by first forming a water-dispersible isocyanate functional polyurethane prepolymer. Such water-dispersible isocyanate functional polyurethane prepolymers can be prepared by reacting polyols, isocyanates, compounds containing carboxylic acids such as diols containing carboxylic acids and, optionally, polyamines. Non-limiting examples of these compounds include any of those previously described.

It is appreciated that the isocyanate functional polyurethane prepolymer used to prepare the polyhydrazide functional polyurethane can include additional functional groups. For instance, the isocyanate functional polyurethane prepolymer can also include any of the reactive functional groups previously described such as carboxylic acid groups that can be at least partially neutralized by an inorganic base to form a salt group and enhance the water-dispersibility/stability of the polyurethane. The polyurethane prepolymer can also be free of any of the additional functional groups and can only include hydrazide functional groups and, optionally, carboxylic acid functional groups or other water-dispersible groups. Further, the isocyanate functional polyurethane prepolymer can include additional linkages other than urethanes including, but not limited to, ether linkages, ester linkages, urea linkages, and any combination thereof.

After forming the water-dispersible isocyanate functional polyurethane prepolymer, the polyurethane prepolymer is reacted with hydrazine and/or a polyhydrazide compound to form a water-dispersible polyhydrazide functional polyurethane. The polyhydrazide compounds can also chain extend the isocyanate functional polyurethane prepolymer. Non-limiting examples of polyhydrazide compounds that can be reacted with the isocyanate functional polyurethane prepolymer include for example any of the non-polymeric hydrazide functional compounds previously described.

The polymeric polyhydrazides can also include core-shell particles comprising a polymeric core at least partially encapsulated by a polymeric shell having two or more hydrazide functional groups. A "polymeric core" means that the core of the core-shell particle comprises one or more polymers and a "polymeric shell" means that the shell of the core-shell particle comprises one or more polymers. Further, a core-shell particle in which the core is at least partially encapsulated by the shell refers to a particle comprising (i) at least a first material that forms the center of the particle (i.e., the core) and (ii) at least a second material (i.e., the shell) that forms a layer over at least a portion of the surface of the first material (i.e., the core). It is appreciated that the polymeric material of the core is generally different/distinguishable from the polymeric material constituting the shell. The core-shell particles can have various shapes (or morphologies) and sizes. For example, the core-shell particles can have generally spherical, cubic, platy, polyhedral, or acicular (elongated or fibrous) morphologies.

The polyhydrazide functional core-shell particles can for example have a polymeric shell comprising urethane linkages, urea linkages, or combinations thereof. For instance, the polymeric shell can comprise a polyurethane with a backbone that includes urethane linkages and, optionally, urea linkages. The polyurethane backbone can also comprise additional linkages including, but not limited to, ester linkages, ether linkages, and combinations thereof. The polyurethane shell can be prepared using any of the previously described components used to prepare polyurethanes including, but not limited to, polyols such as polyester and/or polyether polyols, polyisocyanates, compounds containing carboxylic acid groups such as diols containing carboxylic acid groups, polyamines, and combinations thereof. The polyurethane can also be prepared with hydroxyl functional ethylenically unsaturated components such as hydroxyalkyl esters of (meth)acrylic acid. Non-limiting examples of hydroxyalkyl esters of (meth)acrylic acid include hydroxymethyl (meth)acrylate, hydroxyethyl (meth)acrylate, hydroxypropyl (meth)acrylate, hydroxybutyl (meth) acrylate, and combinations thereof.

The polyurethane prepolymers can also be prepared in the presence of catalysts, polymerization inhibitors, and combinations thereof. Non-limiting examples of catalysts include triethylamine, N-ethyl morpholine, tributylamine, and the like, as well as tin type catalysts such as dibutyl tin dilaurate, dioctyl tin dilaurate, and the like. Polymerization inhibitors that can be used to prevent polymerization of the ethylenically unsaturated compounds during formation of the polyurethane include hydroquinone, hydroquinone monomethyl ether, p-benzoquinone, and the like.

Further, the polymeric core of the polyhydrazide functional core-shell particles that can be used according to the present invention as an adhesion promoter can for example, without being limited thereto, comprise a (meth)acrylate polymer, a vinyl polymer, or a combination thereof. The polymeric core can be formed by polymerization (e.g. by emulsion polymerization) of one or more ethylenically unsaturated monomers and/or polymers during preparation of the core-shell particles. The ethylenically unsaturated monomers that can be used to the form the polymeric core include multi-ethylenically unsaturated monomers, mono-ethylenically unsaturated monomers, or combinations thereof. A "mono-ethylenically unsaturated monomer" refers to a monomer comprising only one ethylenically unsaturated group, and a "multi-ethylenically unsaturated monomer" refers to a monomer comprising two or more ethylenically unsaturated groups. The polymeric core can have a glass transition temperature (Tg) of less 0° C., or less than −10° C., or less than −20° C., or less than −30° C., or less than −40° C. The Tg is based on the supplied/known Tg of the materials used to form the polymeric core.

Non-limiting examples of ethylenically unsaturated monomers that can be used to prepare the polymeric core include, but are not limited to, alkyl esters of (meth)acrylic acid, hydroxyalkyl esters of (meth)acrylic acid, acid group containing unsaturated monomers, vinyl aromatic monomers, and combinations thereof.

Non-limiting examples of alkyl esters of (meth)acrylic acid include methyl (meth)acrylate, ethyl (meth)acrylate, butyl (meth)acrylate, isobutyl (meth)acrylate, ethylhexyl (meth)acrylate, lauryl (meth)acrylate, octyl (meth)acrylate, glycidyl (meth)acrylate, isononyl (meth)acrylate, isodecyl (meth)acrylate, vinyl (meth)acrylate, acetoacetoxyethyl (meth)acrylate, acetoacetoxypropyl (meth)acrylate, and combinations thereof. Other non-limiting examples include di(meth)acrylate alkyl diesters formed from the condensation of two equivalents of (meth)acrylic acid such as, for example, ethylene glycol di(meth)acrylate. Di(meth)acrylate alkyl diesters formed from $C_{2-24}$ diols such as butane diol and hexane diol can also be used.

Non-limiting examples of hydroxyalkyl esters of (meth) acrylic acid include any of those previously described. Non-limiting examples of acid group containing unsaturated monomers include (meth)acrylic acid, itaconic acid, maleic acid, fumaric acid, crotonic acid, aspartic acid, malic acid, mercaptosuccinic acid, and combinations thereof.

Non-limiting examples of vinyl aromatic monomers include styrene, 2,4-dimethylstyrene, ethylstyrene, isopropylstyrene, butylstyrene, vinyl naphthalene, vinyl toluene, divinyl aromatic monomers such as divinyl benzene, and combinations thereof.

The polymeric core and/or polymeric shell that form the core-shell particles of can also comprise additional reactive functional groups besides the hydrazide functional groups. The reactive functional groups can include, but are not limited to, any of the reactive functional groups previously described with respect to the polymer having barrier and elastomeric segments. For example, the polymeric core and/or the polymeric shell can each independently comprise one or more reactive functional groups selected from carboxylic acid groups, amine groups, epoxide groups, hydroxyl groups, thiol groups, carbamate groups, amide groups, urea groups, isocyanate groups (including blocked isocyanate groups), ethylenically unsaturated groups, and combinations thereof. It is appreciated that the polyhydrazide functional core-shell particles are typically free of keto functional groups (also referred to as ketone functional groups) as well as aldo functional groups (also referred to as aldehyde functional groups). The polymeric shell, polymeric core, or both can also be free of (i.e., does not contain) any of the other previously described reactive functional groups if desired. For example, the polymeric shell can comprise hydrazide functional groups and, optionally, additional functional groups such as carboxylic acid groups, hydroxyl groups, or combinations thereof, while the polymeric core can be free of all reactive functional groups.

The polymeric shell is typically covalently bonded to at least a portion of the polymeric core. For example, the polymeric shell can be covalently bonded to the polymeric core by reacting at least one functional group on the monomers and/or prepolymers that are used to form the polymeric shell with at least one functional group of the monomers and/or prepolymers that are used to form the polymeric core. The functional groups can include any of the functional groups previously described provided that at least one functional group of the monomers and/or prepolymers that are used to form the polymeric shell is reactive with at least one functional group of the monomers and/or prepolymers that are used to form the polymeric core. For instance, the monomers and/or prepolymers that are used to form the polymeric shell and polymeric core can both comprise at least one ethylenically unsaturated group that are reacted with each other to form a chemical bond.

The polymeric core and polymeric shell of the core-shell particles can be prepared to provide a hydrophilic polymeric shell with enhanced water-dispersibility/stability and a hydrophobic polymeric core. As such, the polymeric shell can comprise hydrophilic water-dispersible groups while the polymeric core can be free of hydrophilic water-dispersible groups. For example, the polymeric shell can comprise carboxylic acid functional groups that can be at least partially neutralized (i.e., at least 30 percent of the total neutralization equivalent) by an inorganic base, such as a volatile amine, to form a salt group as previously described, while the hydrophobic polymeric core can be free of carboxylic acid groups and salt groups formed therefrom. The hydrophilic water-dispersible groups can increase the water-dispersibility/stability of the polymeric shell in an aqueous medium so that the polymeric shell at least partially encapsulates the hydrophobic core.

The polyhydrazide functional core-shell particles that can be used according to the present invention can for example be prepared by reacting polyurethane prepolymers having isocyanate and ethylenically unsaturated groups with polyhydrazide compounds to form polyurethanes having hydrazide and ethylenically unsaturated groups. The polyurethanes having hydrazide and ethylenically unsaturated groups are then polymerized in the presence of ethylenically unsaturated monomers and/or polymers to form the core-shell particles. The resulting core-shell particles will comprise a polymeric core prepared from polymerized ethylenically unsaturated monomers and/or polymers (i.e. a core comprising acrylic polymer, a vinyl polymer, or a combination thereof) that is covalently bonded to at least a portion of a polyurethane shell having hydrazide functional groups and urethane linkages. The polymeric shell can also comprise additional functional groups (for example, carboxylic acid functional groups) and/or linkages (for example, ester linkages and/or ether linkages) as previously described.

As previously noted, the ethylenically unsaturated monomers can be polymerized in the presence of polyurethanes, which can also contain ethylenically unsaturated groups, to form the core-shell particles. The polymerization can be conducted using art recognized techniques as well as conventional additives such as emulsifiers, protective colloids, free radical initiators, and chain transfer agents known in the art.

The polymeric hydrazides of the present invention (the linear or branched polymeric hydrazides as well as the polymeric hydrazide core-shell particles) can be dispersed in a separate aqueous medium before being combined, e.g. mixed, with the additional components of the coating composition. Thus, a non-polymeric hydrazide, a linear or branched polymeric hydrazide, a polymeric hydrazide functional core-shell particle, or any combination thereof can be dispersed in an aqueous medium to form a separate latex before being mixed with the additional components of the coating composition according to the present invention. As used herein, a "latex", with respect to the aqueous dispersed core-shell particles, refers to an aqueous colloidal dispersion of polymeric particles.

As previously described, the adhesion promoter can comprise (a) the at least one epoxy functional polymer and the thiol functional crosslinker, (b) the hydrazide functional component, or (c) a combination of (a) and (b). As such, the adhesion promoter can comprise any combination of the polymers previously described for (a) and (b). It was surprisingly found that coatings formed from the coating composition comprising a combination of both (a) and (b) exhibited superior adhesion to a substrate as compared to coatings formed from the elastic barrier composition comprising (a) or (b) alone.

When the adhesion promoter comprises the at least one epoxy functional polymer and the thiol functional crosslinker, the adhesion promoter can be used in the coating composition according to the present invention an amount such that the at least one epoxy functional polymer and thiol functional crosslinker comprises at least 2 weight %, such as at least 3 weight %, at least 5 weight %, at least 10 weight %, at least 15 weight %, at least 20 weight %, at least 30 weight %, or at least 40 weight % of the coating composition, based on the total solids weight of the coating composition. The at least one epoxy functional polymer and thiol functional crosslinker can comprise up to 70 weight %, up to 60 weight %, up to 50 weight %, up to 40 weight %, up to 30 weight %, up to 20 weight %, up to 15 weight %, up to 12 weight %, or up to 10 weight % of the coating composition, based on the total solids weight of the coating composition. The at least one epoxy functional polymer and thiol functional crosslinker can for example be comprised in the coating composition in an amount in a range of from 2 to 70 weight %, from 2 to 60 weight %, or 20 to 60 weight %, 30 to 60 weight %, 30 to 50 weight %, or 2 to 15 weight %, or from 3 to 12 weight %, or from 5 to 10 weight % of the coating composition, based on the total solids weight of the coating composition.

It was found that a relatively high amount of the adhesion promoter comprising the at least one epoxy functional and the thiol functional crosslinker helps increase the solids content of the final coating composition. For example, the coating composition can comprise at least 30 weight %, such as from 30 to 60 weight %, of the at least one epoxy functional polymer and the thiol functional crosslinker based on the total solids weight of the coating composition. The resulting coating composition can for example comprise a solids content from 30 weight % to 70 weight %, based on the total weight of the coating composition.

When the adhesion promoter comprises the hydrazide functional component, the adhesion promoter can used in the coating composition according to the present invention in an amount such that the hydrazide functional component comprises at least 1 weight %, at least 2 weight %, or at least 3 weight % of the coating composition, based on the total solids weight of the coating composition. The hydrazide functional component can comprise up to 10 weight %, up to 8 weight %, or up to 5 weight % of the coating composition, based on the total solids weight of the coating composition. The hydrazide functional component can for example comprise a range such as from 1 to 10 weight %, or from 2 to 8 weight %, or from 3 to 5 weight % of the coating composition, based on the total solids weight of the coating composition.

It is appreciated that when the adhesion promoter comprises both (a) the combination of at least one epoxy functional polymer and the thiol functional crosslinker and (b) the hydrazide functional component, the coating composition can include any combination of the previously described amounts of both (a) and (b). For example, when the adhesion promoter comprises both (a) and (b), the coating composition can comprise from 2 to 15 weight % of the epoxy functional polymer and thiol crosslinker, and from 1 to 10 weight % of the hydrazide functional component, based on the total solids weight of the coating composition.

The coating composition of the present invention can optionally further include core-shell particles dispersed in an aqueous medium that are different than the materials previously described. Such core-shell particles can for example have a polymeric shell comprising urethane linkages, urea linkages, or combinations. For instance, the polymeric shell can comprise a polyurethane with a backbone that includes urethane linkages and, optionally, other linkages such as urea linkages, ester linkages, ether linkages, and combinations thereof. The polyurethane shell can be prepared using any of the previously described components with respect to the hydrazide functional core-shell particles, except without the hydrazide functional materials. As such, the aqueous dispersed core-shell particles optionally used in the coating compositions according to the present invention are free of hydrazide functional groups.

Further, such optional core-shell particles may for example have a polymeric core that comprises an acrylic polymer, a vinyl polymer, or a combination thereof. These polymeric cores can be prepared by polymerizing ethylenically unsaturated monomers and/or polymers during preparation of the core-shell particles. The ethylenically unsaturated monomers that can be used to the form the polymeric core include any of the ethylenically unsaturated monomers previously described with respect to the hydrazide functional core-shell particles.

The polymeric core and polymeric shell can also comprise any of the previously described reactive functional groups, except for hydrazide functional groups. It is appreciated that the polymeric shell, polymeric core, or both can be free of any of the other previously described reactive functional groups. For instance, the polymeric shell and polymeric core can be free of keto and aldo functional groups. The core-shell particles can also be free of other groups and linkages. In some examples, the optionally present core-shell particles are free of aromatic groups.

The polymeric shell of such core-shell particles can comprise hydrophilic water-dispersible groups such as carboxylic acid groups that are at least partially neutralized, while the polymeric core can be free of hydrophilic water-dispersible groups. As indicated, the hydrophilic water-dispersible groups can increase the water-dispersibility/stability of the polymeric shell in the aqueous medium so that the polymeric shell at least partially encapsulates the hydrophobic core.

The polymeric shell is typically covalently bonded to at least a portion of the polymeric core by reacting at least one functional group on the monomers and/or prepolymers that are used to form the polymeric shell with at least one functional group on the monomers and/or prepolymers that are used to form the polymeric core such as previously described. The core-shell particles can have various shapes (or morphologies) and sizes including any of the shapes of the previously described core-shell particles having hydrazide functionality.

In some examples, the additional core-shell particles of the present invention are prepared with: (i) ethylenically unsaturated monomers; (ii) polyurethane prepolymers comprising isocyanate functional groups, carboxylic acid functional groups, and ethylenically unsaturated groups; and (iii) optionally, a diamine. The resulting core-shell particles comprise a polymeric core prepared from ethylenically unsaturated monomers that is covalently bonded to at least a portion of a polyurethane shell having pendant carboxylic acid functional groups, urethane linkages, and, optionally, urea linkages. For enhanced water-dispersibility/stability, the carboxylic acid functional groups on the polymeric shell can be at least partially neutralized (i.e., at least 30 percent of the total neutralization equivalent) by an inorganic base, such as a volatile amine, to form a salt group as previously described. The polymeric shell can also include additional pendant and/or terminal functional groups, such as hydroxyl functional groups, keto functional groups, aldo functional groups, or combinations thereof. The polymeric shell can also be free of additional pendant and/or terminal functional groups such as being free of keto functional groups and aldo functional groups.

As indicated, the ore-shell particles can, in some non-limiting examples, comprise keto and/or aldo functional groups. For example, the core-shell particles of the present invention can be prepared with: (i) ethylenically unsaturated monomers; (ii) polyurethane prepolymers comprising isocyanate functional groups, carboxylic acid functional groups, and ethylenically unsaturated groups; and (iii) the Michael addition reaction product of a diamine and keto and/or aldo containing unsaturated monomers. The resulting core-shell particles comprise a polymeric core prepared from ethylenically unsaturated monomers that is covalently bonded to at least a portion of a polyurethane shell having pendant carboxylic acid functional groups, pendant keto and/or aldo functional groups, urethane linkages, and urea linkages. For enhanced water-dispersibility/stability, the carboxylic acid functional groups on the polymeric shell can be at least partially neutralized (i.e., at least 30 percent of the total neutralization equivalent) by an inorganic base, such as a volatile amine, to form a salt group as previously described.

Further, the polymeric core of the core-shell particles optionally used in the coating composition according to the present invention can also include pendant and/or terminal functional groups, such as keto and/or aldo functional groups, by using ethylenically unsaturated monomers that contain additional functional groups. Alternatively, the polymeric core can be free of reactive functional groups such as keto and/or aldo functional groups.

The above described core-shell particles, if used in the coating composition according to the present invention, can for example comprise at least 5 weight %, such as at least 10 weight %, or at least 15 weight % of the coating composition, based on the total solids weight of the coating composition. The core-shell particles can for example comprise up to 40 weight %, such as up to 30 weight %, or up to 20 weight % of the coating composition, based on the total solids weight of the coating composition. The core-shell particles can for example comprise from 5 to 40 weight %, or from 10 to 30 weight %, or from 10 to 20 weight %, or from 10 to 15 weight %, of the coating composition according to the present invention, based on the total solids weight of the coating composition.

It was found that the addition of the previously described core-shell particles to the coating composition of the present invention improves the elastomeric properties of the final cured coating while maintaining good barrier properties. For example, the addition of the core-shell particles improved the elongation at break of the final coating at low temperatures such as at −40° C. while maintaining good barrier properties.

The previously described polymers comprising the barrier and elastomeric segments can also be comprised by core-shell particles present in the coating composition of the present invention, particularly forming the polymeric shell of polymeric core-shell particles. To form such core-shell particles, the previously described polymers comprising the barrier and elastomeric segments can be further modified to include ethylenically unsaturated groups. The thus modified polymers are then reacted with additional ethylenically unsaturated monomers and/or polymers. For example, the polymer comprising the barrier and elastomeric segments can include an isocyanate functional polyurethane comprising aromatic groups, urethane linkages and urea linkages. The isocyanate functional polyurethane can then be reacted with hydroxyl functional ethylenically unsaturated monomers such as hydroxyalkyl esters of (meth)acrylic acid. The resulting polymer containing ethylenically unsaturated groups may then be further polymerized with additional ethylenically unsaturated monomers and/or polymers to form the polymeric core-shell particles. As such, the polymer comprising barrier and elastomeric segments can be a polymeric shell that at least partially encapsulates a polymeric core comprising a (meth)acrylate polymer, a vinyl polymer, or a combination thereof to form a core-shell particle in which at least a portion of the polymeric shell is covalently bonded to at least a portion of the polymeric core.

The polymeric core-shell particles prepared with the polymers having barrier and elastomeric segments can be different from the other polymeric core-shell particles previously described herein. Thus, the polymeric core-shell particles prepared with the polymers having barrier and elastomeric segments may have different types or amounts of groups and/or segments as well as different properties than the other polymeric core-shell particles previously described herein. For example, the polymeric core-shell particles prepared with the polymers having barrier and elastomeric segments have aromatic groups while the other polymeric core-shell particles described herein can be free of aromatic groups. The addition of the polymeric core-shell particles prepared with the polymers having barrier and elastomeric segments has been found to improve both the barrier properties and elastomeric properties of the final cured coating while maintaining good barrier properties.

It is appreciated that the polymers having barrier and elastomeric segments will form the polymeric shell of the afore-mentioned core-shell particles. The polymers having barrier and elastomeric segments can for example comprise at least 75 weight % of the core-shell particles, based on the total solids weight of the core-shell particle. In some examples, the polymers having barrier and elastomeric segments comprise at least 80 weight %, such as at least 85 weight %, or at least 90 weight %, of the core-shell particles, based on the total solids weight of the core-shell particle.

The coating composition according to the present invention can optionally include additional polymers including, but not limited to, elastomeric polymers that can further increase elasticity of the final coating. Non-limiting examples of elastomeric polymers include polyesters, polyethers, polysulfides, natural rubbers, synthetic rubbers, copolymers thereof, or combinations thereof. Examples of suitable polyesters, polyethers, polysulfides and rubber based polymers include, but are not limited to, any of those previously described in the context of the first polymer. Other non-limiting examples of elastomeric polymers are described in U.S. Pat. No. 8,716,402 at column 4, line 34 to column 5, line 2, which is incorporated by reference herein.

The elastomeric polymers can also be dispersed in an aqueous medium to form a separate dispersion before being combined with the other components of the coating composition. The polymer dispersion is then combined with other components to form the elastic barrier composition. The elastomeric polymers can also be dispersed with the previously described components, such as the polymer having barrier and elastomeric segments, and then combined with other components to form the coating composition according to the present invention.

When used in the coating composition of the present invention, the elastomeric polymer can comprise at least 2 weight %, such as at least 2.5 weight %, at least 5 weight %, or at least 8% of the coating composition, based on the total solids weight of the coating composition. The elastomeric polymer can comprise up to 50 weight %, up to 40 weight %, up to 30 weight %, up to 20 weight % or up to 15 weight % of the coating composition, based on the total solids weight of the coating composition. The elastomeric polymer can for example be comprised in the coating composition according to the present invention in an amount in a range of from 2 to 50 weight %, or from 2.5 to 40 weight %, or from 2.5 to 30 weight %, or from 5 to 20 weight %, based on the total solids weight of the coating composition.

The polymers that form the coating composition can have functional groups that are reactive with each other or with themselves such that the polymers are self-crosslinking. The coating composition can optionally include additional crosslinkers other than the thiol functional crosslinker mentioned above. Non-limiting examples of such crosslinkers that can optionally be used with the compositions described herein include carbodiimides, polyhydrazides, aziridines, epoxy resins, alkylated carbamate resins, (meth)acrylates, isocyanates, blocked isocyanates, polyacids, polyamines, polyamides, aminoplasts, melamines, hydroxyalkyl ureas, hydroxyalkyl amides, and any combination thereof. It is appreciated that the coating composition can include a single type or multiple types of crosslinkers. It is further appreciated that when a polyhydrazide is used as a crosslinker and the adhesion promoter also includes a polyhydrazide, the amount of polyhydrazide used in the coating composition is increased. In some examples, the crosslinker is free of a polyhydrazide.

The crosslinkers used with the elastic barrier compositions described herein are reactive with the polymer having barrier and elastomeric segments including core-shell particles formed therewith, additional core-shell particles, if present, the optional elastomeric polymer(s), if present, the adhesion promoter, or any combination thereof. For example, the elastic barrier compositions can comprise: (i) a thiol functional crosslinker reactive with the epoxy functional adhesion promoter; and (ii) a carbodiimide that is reactive with the carboxylic acid functional groups of the polymer having barrier and elastomeric segments including core-shell particles formed therewith, the additional core-shell particles, the elastomeric polymers, or any combination thereof. Non-limiting examples of suitable polycarbodiimides are described in U.S. Patent No. 2011/0070374, which is incorporated by reference herein in its entirety.

The coating composition can also comprise one or more additional crosslinker(s) that can be used to help maintain the desired properties of the final coatings. For example, the additional crosslinker(s) can be added to stop the softening of the final coating at high temperatures (e.g. above 100° C.). Non-limiting examples of such crosslinker(s) include melamines, hydroxyalkyl ureas, hydroxyalkyl amides, blocked isocyanates, and combinations thereof. These crosslinker(s) can be reactive with the polymer having barrier and elastomeric segments including core-shell particles formed therewith, additional core-shell particles, if present, the elastomeric polymer(s), if present, the adhesion promoter, or any combination thereof.

The additional crosslinker(s), if used, can for example comprise at least 1 weight %, such as at least 3 weight %, or at least 5 weight % of the coating composition according to the present invention, based on the total solids weight of the coating composition. The additional crosslinker(s) can for example comprise up to 20 weight %, up to 15 weight %, or up to 10 weight % of the coating composition, based on the total solids weight of the coating composition. The additional crosslinker(s) can for example comprise from 1 to 20 weight %, or from 3 to 15 weight %, or from 5 to 10 weight % of the coating composition according to the present invention, based on the total solids weight of the coating composition.

The coating compositions according to the present invention can further optionally include a platy inorganic filler. As used herein, a "platy inorganic filler" refers to an inorganic material in a platy form. The term "platy" refers to a structure in which one dimension is substantially smaller than the two other dimensions of the structure resulting in a flat type appearance. The platy inorganic fillers are generally in the form of stacked lamellae, sheets, platelets, flakes, or plates with a relatively pronounced anisometry. The platy inorganic filler(s) can further improve the barrier performance of the resulting coating by reducing the permeability of liquids and gases.

Suitable platy inorganic fillers can include those having a high aspect ratio, such as for example, vermiculite, mica, talc, wollastonite, chlorite, metal flakes, platy clays, and platy silicas. Such fillers typically have diameters of 1 to 20 μm (microns), 2 to 5 μm (microns), or 2 to 10 μm (microns). The aspect ratio of the fillers can be at least 5:1, such as at least 10:1 or 20:1. For example, mica flakes may have an aspect ratio of 20:1 or more, talc may have an aspect ratio of 10:1 to 20:1, and vermiculite may have an aspect ratio of from 200:1 to 10,000:1.

The coating compositions of the present invention can include other optional materials as well. For example, the coating compositions can also comprise a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes, and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures or combinations thereof. The terms "pigment" and "colored filler" can be used interchangeably.

Example dyes include, but are not limited to, those that are solvent and/or aqueous based such as phthalo green or blue, iron oxide, bismuth vanadate, and mixtures or combinations thereof.

Example tints include, but are not limited to, pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

In some examples, the coating compositions according to the present invention comprise a decorative component prepared from a pigment and a resin dispersed in an aqueous medium. The pigment can include any of the pigments previously described to provide a desired decorative appearance such as a desired color to the final coating. For instance, the pigment of the decorative component can comprise a white pigment including, but not limited to, titanium dioxide, barium sulfate, zinc oxide, or a combination thereof. Further, the resin used to form the decorative component can include an aqueous dispersible resin. Non-limiting examples of suitable aqueous dispersible resins include acrylic resins. The pigment and aqueous dispersible resin can be dispersed in the same aqueous medium or separate aqueous mediums and later combined to form the decorative component.

The decorative component, if used in the coating composition according to the present invention, can for example comprise at least 0.5 weight %, such as at least 1 weight %, or at least 3 weight % of the coating composition, based on the total solids weight of the coating composition. The decorative component can comprise up to 20 weight %, up to 15 weight %, or up to 10 weight % of the coating composition, based on the total solids weight of the coating composition. The decorative component can for example comprise from 0.5 to 20 weight %, or from 0.5 to 15 weight %, or from 1 to 10 weight % of the coating composition according to the present invention, based on the total solids weight of the coating composition.

Other non-limiting examples of materials that can optionally be used with the coating compositions of the present invention include plasticizers, abrasion resistant particles, corrosion resistant particles, corrosion inhibiting additives, anti-oxidants, hindered amine light stabilizers, UV light absorbers and stabilizers, surfactants, flow and surface control agents, thixotropic agents, organic cosolvents, catalysts, reaction inhibitors, and other customary auxiliaries.

The coating compositions of the present invention can be prepared by mixing a polymer having barrier and elastomeric segments, adhesion promoter, and, optionally, any of the other previously described components. As indicated above, the previously described components can be formed as separate dispersions. As such, the previously described components can first be prepared as separate dispersions and then combined along with the other optional components, if used, to form the coating compositions of the present invention. Alternatively, two or more of the previously described components can be dispersed together in the same aqueous medium before being combined with the remaining components of the coating composition.

After forming the coating compositions of the present invention, the compositions can be applied to a wide range of substrates known in the coatings industry. For example, the coating compositions of the present invention can be applied to automotive substrates, industrial substrates, aerocraft and aerocraft components, marine substrates and components such as ships, vessels, and on-shore and off-shore installations, storage tanks, windmills, nuclear plants, packaging substrates, wood flooring and furniture, apparel, electronics, including housings and circuit boards, glass and transparencies, sports equipment, including golf balls, stadiums, buildings, bridges, and the like. The substrates can be, for example, metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylobutadiene styrene (PC/ABS), polyamide, wood, veneer, wood composite, particle board, medium density fiberboard, cement, stone, glass, paper, cardboard, textiles, leather both synthetic and natural, and the like.

Specific non-limiting examples of suitable substrates include athletic balls, such as soccer balls, basketballs, volleyballs, footballs, racquet balls, squash balls, beach balls, tennis balls, golf balls, baseballs, and the like; inflatable rafts, furniture, toys, and the like; air mattresses, air bags, air shocks, bladders, emergency slides, life vests, medical equipment and devices, such as blood pressure bags, catheters, and the like; tires, such as bike tires, automobile tires, bike tubes, ultra-terrain bike tires, motorcycle tires, lawn tractor tires, and the like; balloons, air bladders, or other footwear applications, packaging material, such as bottles, wraps, food, or plastic sheets, hoses, garbage bags, plastic light bulbs, fire extinguishers, LED displays, plasma TV's, parachutes, scuba tanks, gas cylinders, flexible foam, rigid foam, other pipes, hoses, tubes, and the like; architectural needs, such as windows, roofing, siding, and the like; fiber optic cables, seals and gaskets, batteries, clothing and other textiles, swimming pool liners and covers, hot tubs, tanks, electronics, buckets, and pails.

The coating compositions of the present invention are particularly useful when applied to elastomeric substrates that exhibit a degree of elasticity. Examples of such substrates include, but are not limited, thermoplastic urethane, synthetic leather, natural leather, finished natural leather, finished synthetic leather, ethylene vinyl acetate foam, polyolefins and polyolefin blends, polyvinyl acetate and copolymers, polyvinyl chloride and copolymers, urethane elastomers, synthetic textiles, natural textiles, rubbers, and combinations thereof. The substrates can also include those that have gas permeability such as substrates comprising polymers, including but not limited to, polyesters, polyolefins, polyamides, cellulosics, polystyrenes, polyacrylics, and polycarbonates. Poly(ethylene terephthalate), poly(ethylene naphthalate), and combinations thereof. It is appreciated that the substrates can include gas permeable elastomeric materials.

It was found that elastic gas barrier coating compositions can be applied to a substrate and cured to form elastic gas barrier coatings that provide both low temperature elasticity and good oxygen/nitrogen gas barrier performance. For example, coatings deposited from the elastic gas barrier coating compositions described herein have been found to exhibit an elasticity of at least 25% at temperatures as low as −40° C. The coatings also exhibit an elasticity of at least 100% at temperatures around room temperature (20° C. to 25° C.) and higher. The elastic gas barrier coatings further exhibit good oxygen permeance at temperatures from −40° C. to 100° C., such as an oxygen permeance of 80 cc·mm/m$^2$·day·atm or less at 23° C. and 50% relative humidity. The elasticity is determined by measuring the elongation at break as previously described.

In addition, the elastic gas barrier coatings of the present invention exhibit improved adhesion. For example, coatings deposited from the coating compositions described herein have been found to exhibit an adhesion of at least 4.0, at least 5.0, at least 6.0, at least 7.0, at least 8.0, or at least 9.0 N/mm as determined with an Instron Model 4443 manufactured by Instron® and following the instructions contained in the Instron Model 4443 manual to measure peel strength of a rectangular sample 10 mm wide, peeled at 50 mm/minute, at an angle of 180° from the substrate.

To increase adhesion of a coating to a substrate, the substrate can be chemically and/or mechanically treated prior to applying a coating composition or film described herein. For instance, the surface of the substrate can be roughened, treated with steam, treated with a chemical solution, or heated prior to applying a coating composition or film. Any combination of these treatment methods can be used together to improve adhesion of a coating to the substrate.

The process of roughening the surface of a substrate can comprise abrading or scuffing the surface of the substrate such that the texture of the surface is adjusted to include increased or additional vertical deviations. The surface of the substrate can be roughened using various methods including, but not limited to, sandblasting, scrubbing with sandpaper, or a combination thereof. As used herein, "sandblasting" refers to a process of spraying sand, or fine particles of other materials such as gravel, over the surface of a substrate. Sandblasting can use compressed-air to spray the sand or other fine particulate materials at a pressure and speed sufficient to roughen the surface of the substrate.

As indicated, the surface of the substrate can also be treated with steam and/or a chemical solution. As used herein, "steam" refers to a vapor or mist formed from water, and a "chemical solution" refers to a liquid mixture of two or more substances. Non-limiting examples of chemical solutions that can be used to treat the surface of the substrate include solutions comprising chlorinated compounds. Examples of suitable chlorinated compounds include, but are not limited to, hypochlorite, trichloroisocyanuric acid, and combinations thereof. A commercially available chemical solution includes Clorox Clean-Up® from the Clorox Company. The steam and/or chemical solution can be applied to the surface of the substrate to remove contaminates and other objects.

Further, the substrate or the surface of the substrate that is to be coated can be heated to further increase adhesion of a coating. For example, the substrate or surface of the substrate can be heated to a temperature of 100° C. to 300° C., or from 120° C. to 280° C., or from 150° C. to 250° C. The substrate or surface of the substrate can be heated with convective heat, electromagnetic radiation such as infrared radiation, or a combination thereof. "Convective heat" refers to a heat transfer in a gas, and "electromagnetic radiation" refers to radiant energy released by electromagnetic processes. Electromagnetic radiation includes radio waves, microwaves, infrared and near-infrared radiation, visible light, and ultraviolet radiation.

As noted above, the surface of a substrate can be treated with any combination of the previously described treatment methods. For instance, the surface of a substrate can be sandblasted, treated with steam and a hypochlorite chemical solution, and then heated to a temperature of 100° C. to 300° C. prior to applying a coating composition.

The coating compositions of the present invention can be applied to the substrate by various means known in the art including, but not limited to, spraying, dipping, brushing, rolling, and the like. Further, the coating compositions can be applied to a substrate using various devices. For instance, when applied to the inner liner of a tire, the coating compositions can be spray applied using devices that secure and rotate the tire during application.

In some examples, referring to FIG. 1, the coating composition is spray applied to the inner portion of a tire 12, such as an inner liner of tire 12, using a device 10 that secures and rotates the tire 12 in a vertical position during application. The device 10 includes a rotator frame 14 and a motor 16, such as an electric motor, that is mounted on the rotator frame 14. One or more drive rollers 18 and free spinning rollers 20 are further attached to the rotator frame 14. It is appreciated that the number of drive rollers 18 and free spinning rollers 20 can be selected based on the size of the tire 12 in order to support and rotate the tire 12.

Figure 2:
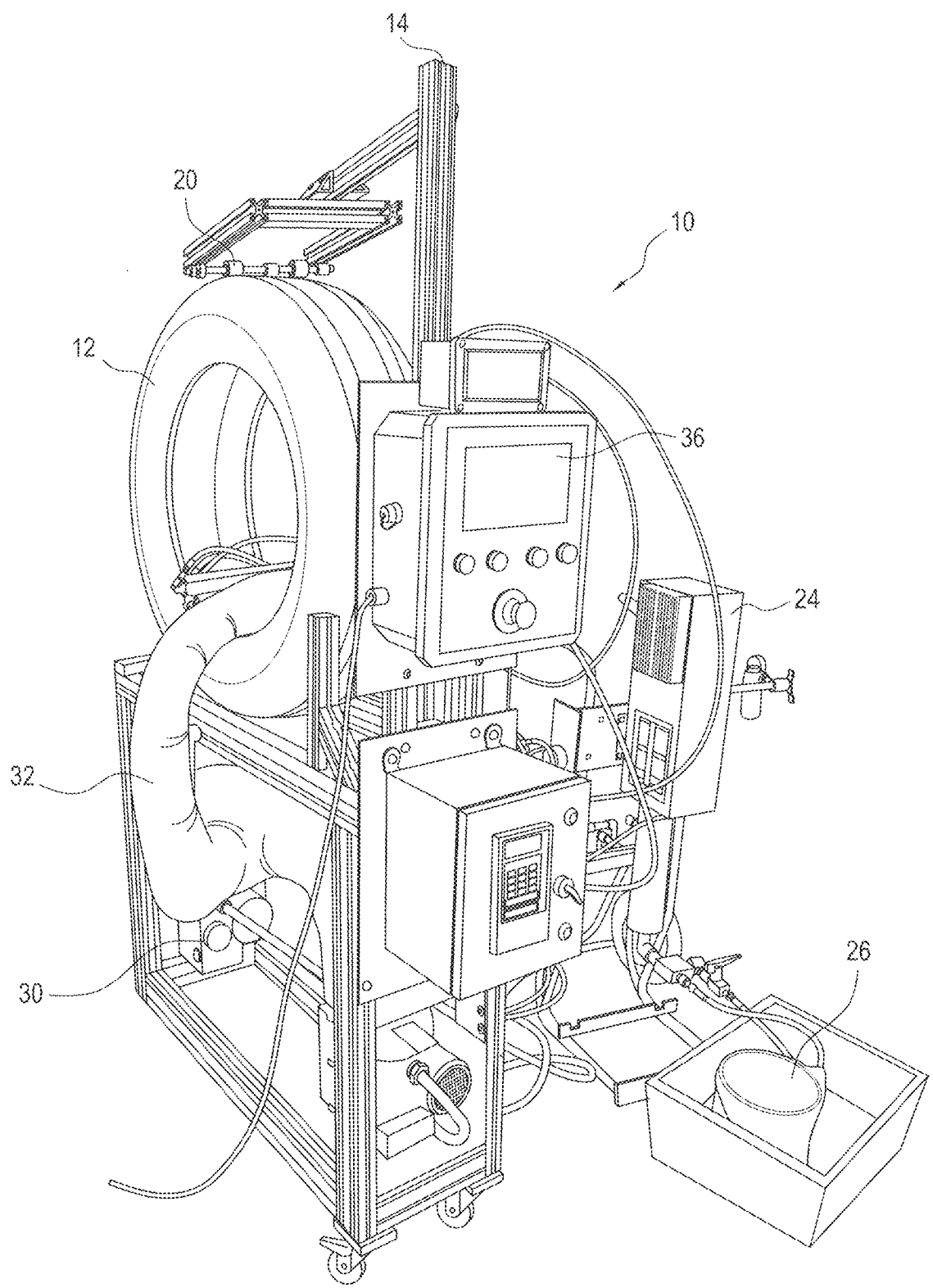
FIG. 2 is a second perspective view of the device shown in FIG. 1.

Referring to FIGS. 1 and 2, the tire 12 is placed in a vertical position onto the rotator frame 14 such that the drive rollers 18 and free spinning rollers 20 contact the outside and/or inside of the tire 12. The drive rollers 18 and free spinning rollers 20 can be positioned on various areas of the tire 12. For instance, and as shown in FIG. 1, the drive rollers 18 and free spinning rollers 20 can be mounted to the rotator frame 14 such that the drive rollers 18 and free spinning rollers 20 contact the bottom outside portion of the tire 12. In addition, and as shown in FIG. 2, free spinning rollers 20 can be mounted to the rotator frame 14 such that free spinning rollers 20 contact the top outside portion of the tire 12. It was found that free spinning rollers 20 in contact with the top outside portion of the tire 12 provide a downward force onto the tire that eliminates tire 12 bounce during rotation of the tire 12.

Figure 3:
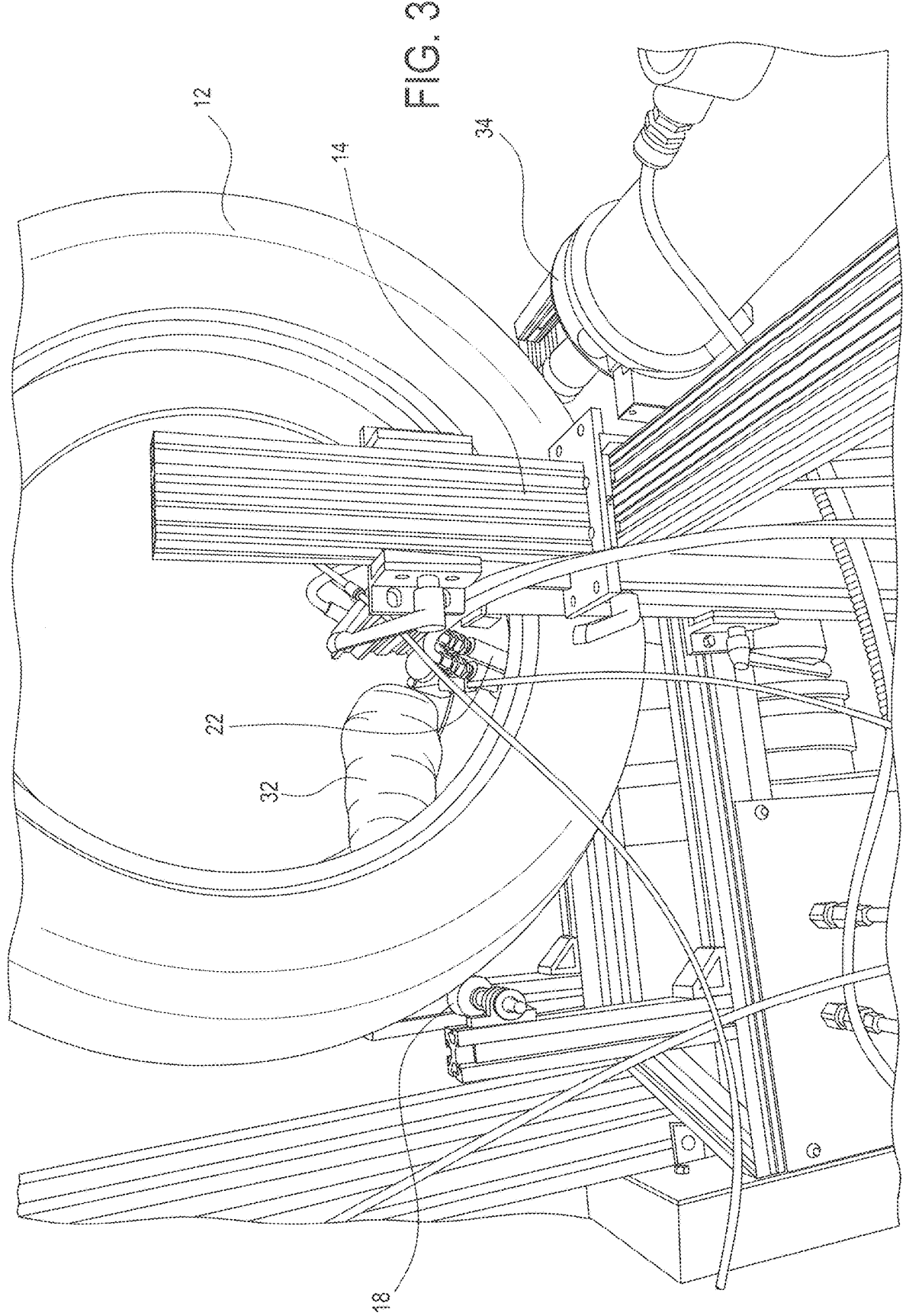
FIG. 3 is an expanded view of a portion of the device shown in FIG. 1.

Referring again to FIGS. 3 and 4, the device 10 further includes spray guns 22 including, but not limited to, airless spray guns 22. The spray guns 22 are mounted to the rotator frame 14 and can be adjusted to different positions to dispense the coating compositions of the present invention onto an inside or interior of the tire 12 such as the inner liner of the tire 12. The spray guns 22 can be adjusted to achieve uniform coating coverage over the interior of the tire 12. Further, the nozzles of each spray gun 22 can be sized to help achieve the desired coating coverage.

As shown in FIGS. 1 and 2, the previously described spray guns 22 are coupled to a high pressure pump 24 to deliver the coating compositions of the present invention from a reservoir or container 26 to the spray guns 22. When the spray guns 22 are not in operation, the coating composition is recirculated back to the pump 24 under high pressure. Each high pressure pump 24 can be connected to a spray gun 22 with a high pressure fluid line. As further shown in FIG. 1, a high pressure regulator 28 can be used to set the coating pressure during application of the coating composition.

Figure 4:
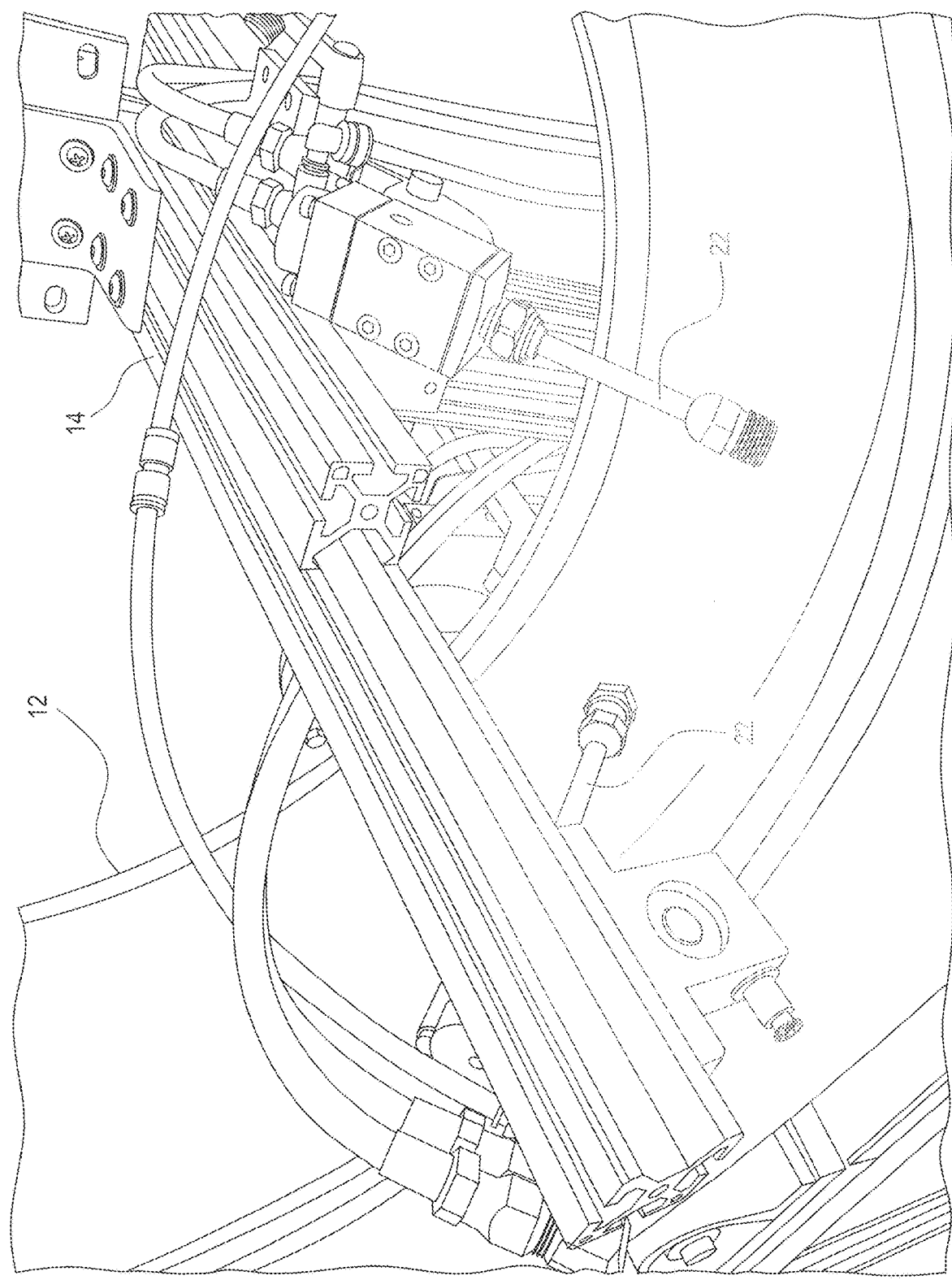
FIG. 4 is a second expanded view of a portion of the device shown in FIG. 1.

Referring to FIG. 4, the device 10 can further comprise an air blower/heater 30 that produces heated air and which can be applied to the tire 12 with a duct or other conduit 32 prior to, during, and/or after application of the coating composition. The temperature and air flow rate of the heated air can be selected to achieve optimal drying of the coating applied over the tire 12.

The device 10 can further include other components including, but not limited to, a gear and sensor 34 that can provide motor speed feedback to help control the rotational speed of the tire 12 (see FIG. 4). A control system 36, as shown in FIGS. 1 and 2, can also be used to control the various components of the device 10. For instance, the device 10 can comprise a control system 36 that controls the spray guns 22/coating flow rate, air blower/heater 30, rotational speed of the tire 12, and the number coatings applied to the tire 12. The control system 36 can comprise one or more microprocessors, CPUs, and/or other computing devices.

During operation, the control system 36 can cause the tire 12 to rotate along the vertical position. As the tire 12 is rotating, the control system 36 will trigger the spray guns 22 to apply the coating compositions of the present invention to the interior of the tire 12 while heated air from the air blower/heater 30 is blown into the interior of the tire 12. It is appreciated that the rotational speed of the tire 12, the coating flow rate, and the number of coats applied will determine the final coating thickness. As such, the control system 36 can be configured to provide a desired coating thickness by controlling the rotational speed of the tire 12, the coating flow rate, and the number of coats applied.

Figure 5:
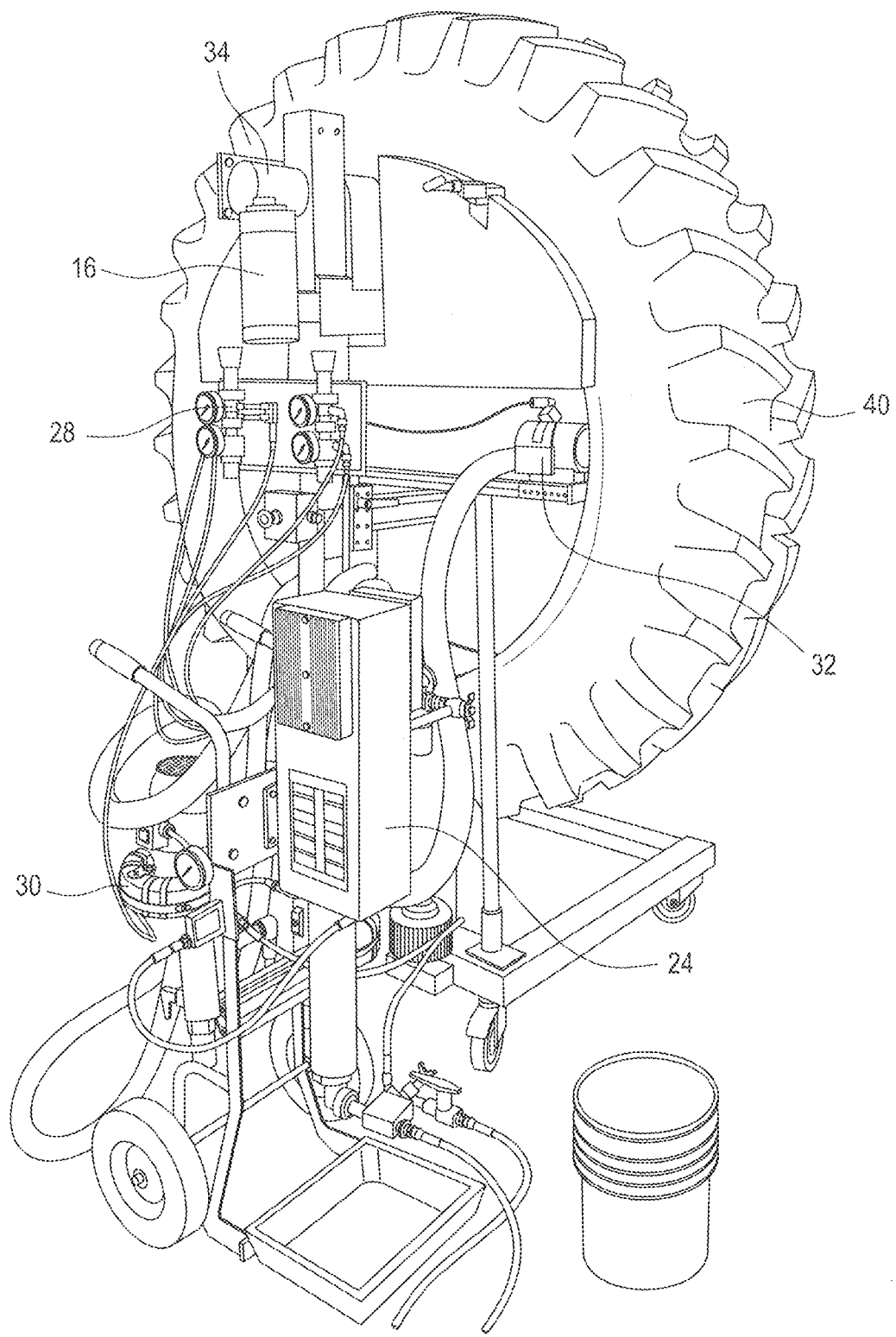
FIG. 5 is a perspective view of a device for spraying a coating composition to a tractor tire according to the present invention.

The above device 10 can be used to apply the coating compositions of the present invention to various types of tires 12 such as a passenger tire 12 for example. The device 10 can also be modified to apply the coating compositions of the present invention to other tires such as a tractor tire 40 as shown in FIG. 5. For example, the drive rollers 18 and free spinning rollers 20 can be positioned on a cover formed along the interior of the 40 such that the drive rollers 18 and free spinning rollers 20 contact an inside portion of the tire 12.

After the coating compositions are applied to a substrate, the compositions can be dried and/or cured at ambient conditions, with heat, or with other means such as actinic radiation to form a coating. As used herein, the terms "curable", "cure", and the like mean that at least a portion of the resinous materials in a composition is crosslinked or crosslinkable. Further, "ambient conditions" refers to the conditions of the surrounding environment (e.g., room temperature of 20° C. to 25° C.). The term "actinic radiation" refers to electromagnetic radiation that can initiate chemical reactions. Actinic radiation includes, but is not limited to, visible light, ultraviolet (UV) light, X-rays, and gamma radiation.

The coating composition of the present invention can also be at least partially applied to an elastomeric substrate and co-molded or co-vulcanized therewith. "Co-vulcanization" and like terms refer to the process of chemically producing crosslinks or bonds between the elastomeric materials in the coating composition and the substrate. When a crosslinker is used with the coating composition, it will be appreciated that two "crosslinking" mechanisms occur—one between the elastomeric materials in the coating composition and the substrate, and one between the functional groups on the polymeric materials and the crosslinker(s) used in the coating composition.

In addition, the coating composition can also be applied to a substrate as a dehydrated film and then formed into the final coating. For example, the coating composition of the present invention can be applied to a first substrate and then dried such that substantially all water in the coating composition is evaporated to thereby form an elastic barrier film. The first substrate can include any of those previously described provided that the dehydrated film does not form bonds with the substrate. The coating composition can also be applied to the first substrate using any technique known in the art such as spraying for example.

As indicated, substantially all water in the coating composition is evaporated after being applied to the first substrate. As used herein, "substantially all water" refers to at least 90 weight % of all water in the coating composition. The water can be evaporated at ambient conditions or by applying heat. In some examples, substantially all water in the coating composition is evaporated by heating the coating composition at temperature of 25° C. to 150° C.

After forming an elastic barrier film by evaporating substantially all water from the coating composition, the film can be removed from the first substrate and applied to a second substrate. The second substrate can include any of the substrates previously described. The elastic barrier film may then be cured and/or further dried to form the final coating over the substrate. The film can be cured and/or dried by: (i) applying actinic radiation to the applied film; (ii) applying convective heat to the applied film; (iii) applying the elastic barrier film to the second substrate while the second substrate is heated above ambient temperatures; or a combination thereof.

Alternatively, the film is cured and/or dried by maintaining the film on the second substrate at ambient conditions for a time sufficient to allow the curing and/or drying of the elastic barrier film. As used herein, a "time sufficient", with respect to the curing and/or drying of the elastic barrier film, refers to a period of time necessary to remove any remaining solvents and form the final coating such as with a crosslinking process.

It was found that the formation and application of a preformed film provides a more continuous coating over the final substrate. The elastic barrier film also allows for easy storage, transportation, and application of the film prior to formation of the final coating.

The coating formed over the final substrate according to any of the methods previously described will typically have a dry film thickness of 2.54 µm to 2.03 mm (0.1 to 80 mils), such as 12.7 µm to 1.27 mm (0.5 to 50 mils) or 0.25 mm to 0.76 mm (10 to 30 mils).

The coating compositions described herein can be applied to a substrate to form a monocoat. As used herein, a "monocoat" refers to a single layer coating system that is free of additional coating layers. Thus, the coating composition can be applied directly to a substrate and dehydrated or cured to form a single layer coating, i.e. a monocoat.

Alternatively, the coating compositions according to the present invention can be applied to a substrate along with additional coating layers to form a multi-layer coating. For example, the elastic barrier coatings described herein can be applied directly over a substrate or over a primer layer as a basecoat layer and additional coating layers can be applied over the basecoat as a topcoat. The elastic barrier coatings can also be applied over a basecoat as a topcoat. As used herein, a "primer" refers to a coating composition from which an undercoating may be deposited onto a substrate in order to prepare the surface for application of a protective or decorative coating system. A "basecoat" refers to a coating composition from which a coating is deposited onto a primer and/or directly onto a substrate, optionally including components (such as pigments) that impact the color and/or provide other visual impact. A "topcoat" refers to the uppermost layer of a multi-layer system that includes that can provide a protective and/or decorative layer.

Further, each coating composition can be applied as a dry-on-dry process where each coating composition is dried or cured to form a coating layer prior to application of another composition coating. Alternatively, all or certain combinations of each coating composition described herein can be applied as a wet-on-wet process and dried or cured together.

The present invention is also directed to a multi-layer elastic barrier coating that comprises: (a) an adhesive coating layer applied over at least a portion of a substrate; and (b) an elastic barrier coating applied over at least a portion of the adhesive coating layer. The adhesive coating layer can be applied directly over the substrate and/or over a first coating layer such as a primer layer. Further, the elastic barrier coating can be applied directly to the adhesive coating layer or, alternatively, an intermediate can be applied over the adhesive coating layer before applying the elastic barrier coating.

The adhesive coating layer used in the afore-mentioned multi-layer coating according to the present invention is formed from a coating composition comprising at least one epoxy functional polymer and a thiol functional crosslinker reactive with the epoxy functional polymer. The epoxy functional polymer can include any of the previously described polymers comprising two or more epoxy functional groups. For example, the epoxy functional polymer can comprise an epoxy functional polyester such as a lactone based polyester. As indicated above, the epoxy functional polyester can include additional groups such as hydroxyl groups, aromatic groups, aliphatic cyclic groups, or combinations thereof.

It is appreciated that the adhesive coating layer can include one or multiple polymers that independently comprise two or more epoxy functional groups per molecule and which are the same or different from each other. For instance, the adhesive coating layer can comprise at least one, at least two, or all three of the following: (1) a polymer, such as a polyester, comprising two epoxy functional groups per molecule and, optionally, hydroxyl functional groups, aromatic groups, and aliphatic cyclic groups; (2) a polymer, such as a polyester, comprising greater than two epoxy functional groups per molecule such as at least four epoxy functional groups per molecule and, optionally, hydroxyl functional groups, aromatic groups, and aliphatic cyclic groups; and (3) core shell rubber particles dispersed in an epoxy resin, such as an epoxy resin based on bisphenol-A.

As indicated, the at least one polymer comprising two or more epoxy functional groups per molecule is also combined, e.g. mixed, with a thiol functional crosslinker reactive with the epoxy functional groups. The thiol functional crosslinker may include any of the thiol functional crosslinkers previously described such as a compound having two or more thiol functional groups, or at least three thiol functional groups, or at least four thiol functional groups.

The epoxy functional polymers and the thiol functional crosslinkers used in the composition that forms the adhesive coating layer can be mixed together in an aqueous medium to provide a desired equivalent ratio of epoxy functional groups to thiol functional groups. For example, the epoxy functional polymer(s) and the thiol functional crosslinker(s) can be mixed together to provide an equivalent ratio of epoxy functional groups to thiol functional groups in a range of from 0.6:1 to 1.2:1, or from 0.8:1 to 1.2:1, or from 0.9:1 to 1.1:1 or about 1.1:1.

The composition that forms the adhesive coating layer can optionally also comprise additional components. For example, the composition that forms the adhesive coating layer can also comprise any of the previously described non-polymeric polyhydrazides and/or polymeric hydrazides to further increase the adhesive properties of the adhesive layer. Other non-limiting examples of materials that can be used with the coating compositions of the present invention include any of the crosslinkers previously described, plasticizers, abrasion resistant particles, corrosion resistant particles, corrosion inhibiting additives, anti-oxidants, hindered amine light stabilizers, UV light absorbers and stabilizers, surfactants, flow and surface control agents, thixotropic agents, organic cosolvents, catalysts, reaction inhibitors, and other customary auxiliaries. It is appreciated that the adhesive layer is typically free of the polymer comprising barrier and elastomeric segments, the additional core-shell particles, and/or the additional elastomeric polymers described previously.

The elastic barrier coating layer of the multilayer coating according to the present invention is formed from a coating composition comprising a polymer comprising: (i) a barrier segment comprising aromatic groups and urethane linkages, urea linkages, or a combination thereof; and (ii) an elastomeric segment that is different from (i). The barrier segment comprises at least 30 weight % of the polymer based on the total solids weight of the polymer. The coating composition that forms the elastic barrier coating layer of the multilayer coating can optionally further include any of the previously described core-shell particles, elastomeric polymers, crosslinkers, and/or other additional materials. The coating composition can also include any of the previously described non-polymeric polyhydrazides and/or polymeric hydrazides. It is appreciated that the elastic barrier layer can be free of the epoxy functional polymers and the thiol functional crosslinkers. Alternatively, the elastic barrier layer can also comprise the epoxy functional polymers and the thiol functional crosslinkers.

The composition that forms the adhesive coating layer can be applied over a substrate and dehydrated or cured at ambient conditions, with heat, or with other means such as actinic radiation to form the adhesive coating layer prior to application of the elastic barrier coating layer (i.e. a dry-on-dry process). Alternatively, the composition that forms the adhesive coating layer can be applied over a substrate, and the composition that forms the elastic barrier composition can be applied over the composition that forms the adhesive coating layer. Both layers can then be dried and/or cured together.

It has been found that the adhesive coating layer can improve the adhesion of the elastic gas barrier coating layer to a substrate. For example, the elastic gas barrier coating layer deposited over the adhesive coating layer has been found to exhibit an adhesion of at least 4.0, at least 5.0, at least 6.0, at least 7.0, at least 8.0, or at least 9.0 N/mm as determined with an Instron Model 4443 manufactured by Instron® and following the instructions contained in the Instron Model 4443 manual to measure peel strength of a rectangular sample 10 mm wide, peeled at 50 mm/minute, at an angle of 180° from the substrate.

For purposes of the present detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" polymer, "a" crosslinker, "a" core-shell particle, and the like refer to one or more of any of these items.

The following examples are presented to demonstrate the general principles of the invention. The invention should not be considered as limited to the specific examples presented. All parts and percentages in the examples are by weight unless otherwise indicated.

Further, various measurements in the Examples were determined as follows. Brookfield viscosities were measured at 25° C. on a Brookfield Viscometer DV-II+Pro using spindle #2 at 60 RPM. Acid values and hydroxyl values were determined using a Metrohm 798 MPT Titrino automatic titrator according to ASTM D 4662-15 and ASTM E 1899-16. Non-volatile contents were measured by comparing initial sample weights to sample weights after exposure to 110° C. for 1 hour. Epoxy equivalent weights were determined by titration with 0.1 N perchloric acid in glacial acetic acid as the titration reagent and a Metrohm 888 Titrando titrator according to ASTM D1652-11e1.

Moreover, weight and number average molecular weight of polymeric samples were measured by gel permeation chromatography relative to linear polystyrene standards of 800 to 900,000 Da. Gel permeation chromatography was performed using a Waters 2695 separation module with a Waters 2414 differential refractometer (RI detector). Tetrahydrofuran (THF) was used as the eluent at a flow rate of 1 ml min-1. Two PLgel Mixed-C (300×7.5 mm) columns were used for separation.

Example 1

Preparation of a Polyether Polyurethane Dispersion

A polyether polyurethane dispersion with 40% elastomeric segment and 60% barrier segment was prepared from the components listed in Table 1.

TABLE 1

| Component | Amount (grams) |
|---|---|
| Charge A | |
| Polytetrahydrofuran (MW of 1,000 g/mol) | 334.0 |
| Dimethylolpropionic acid | 49.9 |
| Methyl ethyl ketone | 332.4 |
| 1,3-bis(2-hydroxyethoxy) benzene | 157.5 |
| Charge B | |
| Toluene diisocyanate | 295 |
| Charge C | |
| Methyl ethyl ketone | 29.5 |
| Charge D | |
| Water | 1339.0 |
| Dimethylethanolamine | 26.9 |
| Ethylenediamine | 6.9 |

Charge A was added to a four-neck round bottom flask equipped with an electronic temperature probe, mechanical stirrer, condenser, nitrogen atmosphere, and a heating mantle. Charge A was stirred at 78° C. for 30 minutes then cooled to 35° C. Charge B was then added over 10 minutes. Charge C was used to rinse the addition funnel used for B. The mixture was held at 78° C. for two hours.

Charge D was heated in a separate 12 liter four-neck flask under a nitrogen atmosphere to 60° C. About 1078.8 g of the reaction product of charges A, B, and C was added to charge D over a 12 minute period. The methyl ethyl ketone was then removed by vacuum distillation at 50° C. The final dispersion had a Brookfield viscosity of 180 centipoise, an acid value of 10.3, a pH of 7.65, and a nonvolatile content of 39.9%.

Example 2

Preparation of a Polyurethane-Acrylic Dispersion

Part A: A polyurethane solution in ethylenically unsaturated monomers was first prepared from the components listed in Table 2.

TABLE 2

| Component | Amount (grams) |
| --- | --- |
| Charge A | |
| 2-ethylhexyl acrylate | 494.4 |
| FOMREZ ® 66-56 [1] | 795 |
| 2,6-di-tert-butyl 4-methyl phenol | 2.9 |
| Hydroxyethyl methacrylate | 38 |
| Dimethylol propionic acid | 120 |
| Triethyl amine | 5.8 |
| Charge B | |
| Isophorone diisocyanate | 552 |
| Charge C | |
| 2-ethylhexyl acrylate | 35.7 |
| Dibutyl tin dilaurate | 1.5 |
| Charge D | |
| 2-ethylhexyl acrylate | 494 |
| Hexanediol diacrylate | 86.4 |

[1] Hydroxyl terminated saturated linear polyester polyol, commercially available from Chemtura.

Charge A was added to a four-neck round bottom flask equipped with a thermocouple, mechanical stirrer, and condenser. Charge A was heated to 50° C. and held for 15 minutes. Charge B was added over 10 minutes and mixed for 15 minutes. Charge C was added and immediate exotherm was observed. After exotherm subsided, the mixture was heated to 90° C., and held for 60 minutes. The isocyanate equivalent weight was measured to be 1132. The mixture was cooled to 70° C., and Charge D was added. The mixture was kept at 60° C. before being dispersed into water.

Part B: A polyurethane-acrylic dispersion comprising core-shell particles with carboxylic acid functionality was prepared from the components listed in Table 3.

TABLE 3

| Component | Amount (grams) |
| --- | --- |
| Charge A | |
| DI water | 3750 |
| Dimethylethanolamine | 80 |
| Ethylenediamine | 52.5 |

TABLE 3-continued

| Component | Amount (grams) |
| --- | --- |
| Charge B | |
| Polyurethane solution in ethylenically unsaturated monomers of Part A | 2500 |
| Charge C | |
| Ammonium persulfate | 7.0 |
| DI water | 150 |
| Charge D | |
| FOAMKILL ® 649 [2] | 1.2 |
| ACTICIDE ® MBS [3] | 21 |
| DI water | 50 |

[2] A non-silicone defoamer, commercially available from Crucible Chemical Company.
[3] Microbiocide formed of a mixture of 1,2-benzisothrazolin-3-one and 2-methyl-4-isothiazolin-3-one, commercially available from Thor GmbH.

Charge A was added to a four-neck round bottom flask equipped with a thermocouple, mechanical stirrer, and condenser. Charge A was heated to 50° C. and held for two hours with an $N_2$ blanket. Charge B was then dispersed into the flask over 20 minutes and mixed for an additional 15 minutes. Charge C was added over 15 minutes. The temperature rose from 50° C. to 71° C. due to polymerization exotherm. The mixture was held at 75° C. for an additional one hour. After being cooled to 40° C., Charge D was added and mixed for an additional 15 minutes. The resulting latex was filtered via a 10 μm bag. The latex had a nonvolatile content of 38.8%.

Example 3

Preparation of a Polyurethane-Acrylic Dispersion

Part A: A polyester prepolymer was first prepared from the components listed in Table 4.

TABLE 4

| Component | Amount (grams) |
| --- | --- |
| Diethylene glycol | 1140.9 |
| Succinic anhydride | 1128.0 |
| Butyl stannoic acid | 10.63 |

The components listed in Table 4 were charged in a four-neck round bottom flask equipped with an electronic temperature probe, mechanical stirrer, condenser, dry nitrogen sparge, and a heating mantle. The temperature was gradually increased to 210° C. over an eight hour period while stirring, sparging with nitrogen, and collecting the distillate. The reaction temperature was then held at 210° C. for 10 hours until the acid value dropped to 3.1 and 335 ml of distillate was collected.

The final product was a dark orange liquid with a Gardner-Holdt viscosity of Z6+, a hydroxyl value of 72.6, a number average molecular weight ($M_N$) of 1636 g/mol, a weight average molecular weight ($M_W$) of 4127 g/mol, and a nonvolatile content of 98.4%.

Part B: A polyurethane/acrylic dispersion comprising core-shell particles with carboxylic acid functionality was prepared from the components listed in Table 5. The core-shell microparticles comprised 20% core and 80% shell. The shell comprised 40% elastomeric segment and 60% barrier segment.

TABLE 5

| Component | Amount (grams) |
|---|---|
| Charge A | |
| Polyester of Part A | 1336.3 |
| Dimethylolpropionic acid (DMPA) | 200.5 |
| Hydroxyethyl methacrylate (HEMA) | 36.2 |
| 1,3-bis(2-hydroxyethoxy) benzene | 534.6 |
| Butylated hydroxytoluene (Ionol) | 3.34 |
| Charge B | |
| Butyl acrylate (BA) | 638.0 |
| Ethylene glycol dimethacrylate (EGDMA) | 83.5 |
| Charge C | |
| Toluene diisocyanate (TDI) | 1137.3 |
| Charge D | |
| Butyl acrylate (BA) | 113.7 |
| Charge E | |
| Water | 4373.1 |
| Dimethylethanolamine (DMEA) | 110.3 |
| Ethylenediamine (EDA) | 61.4 |
| Diethanolamine (DEA) | 26.9 |
| FOAMASTER® MO 2111 [4] | 7.68 |
| Charge F | |
| Water | 265.4 |
| Charge G | |
| Water | 4373.1 |
| t-Butyl hydroperoxide (70%) | 6.92 |
| Charge H | |
| Water | 211.4 |
| Ferrous ammonium sulfate | 0.039 |
| Sodium metabisulfite | 10.38 |
| Dimethylethanolamine (DMEA) | 7.3 |
| Charge I | |
| Water | 15.8 |
| PROXEL® GXL [5] | 8.0 |

[4] A defoamer, commercially available from BASF Corporation.
[5] A preservative, commercially available from Arch Chemicals.

Charge A was stirred at 110° C. for thirty minutes in a four-neck round bottom flask equipped with an electronic temperature probe, mechanical stirrer, condenser, and a heating mantle. Charge B was added and the mixture was adjusted to 100° C. One third of charge C was added over 24 minutes. The mixture was cooled to 45° C. and the remainder of Charge C was added over twenty minutes. Charge D was used to rinse the addition funnel used for C. The reaction mixture was held at 85° C. for two hours. Charge E was heated in a separate 12 liter four-neck flask under a nitrogen atmosphere to 80° C. Next, 3757 g of the reaction product of charges A, B, C, and D was added to charge E over a 45 minute period. The mixture was cooled to 30° C. and a nitrogen atmosphere was established and maintained in the flask for the remainder of the reaction. Charges F and G were added to the reaction flask followed by a fifteen minute addition of charge H. The temperature rose exothermically to 40° C. The final dispersion had a Brookfield viscosity of 55 centipoise, an acid value of 12.2, a pH of 7.34, and a nonvolatile content of 43.1%.

Figure 6:
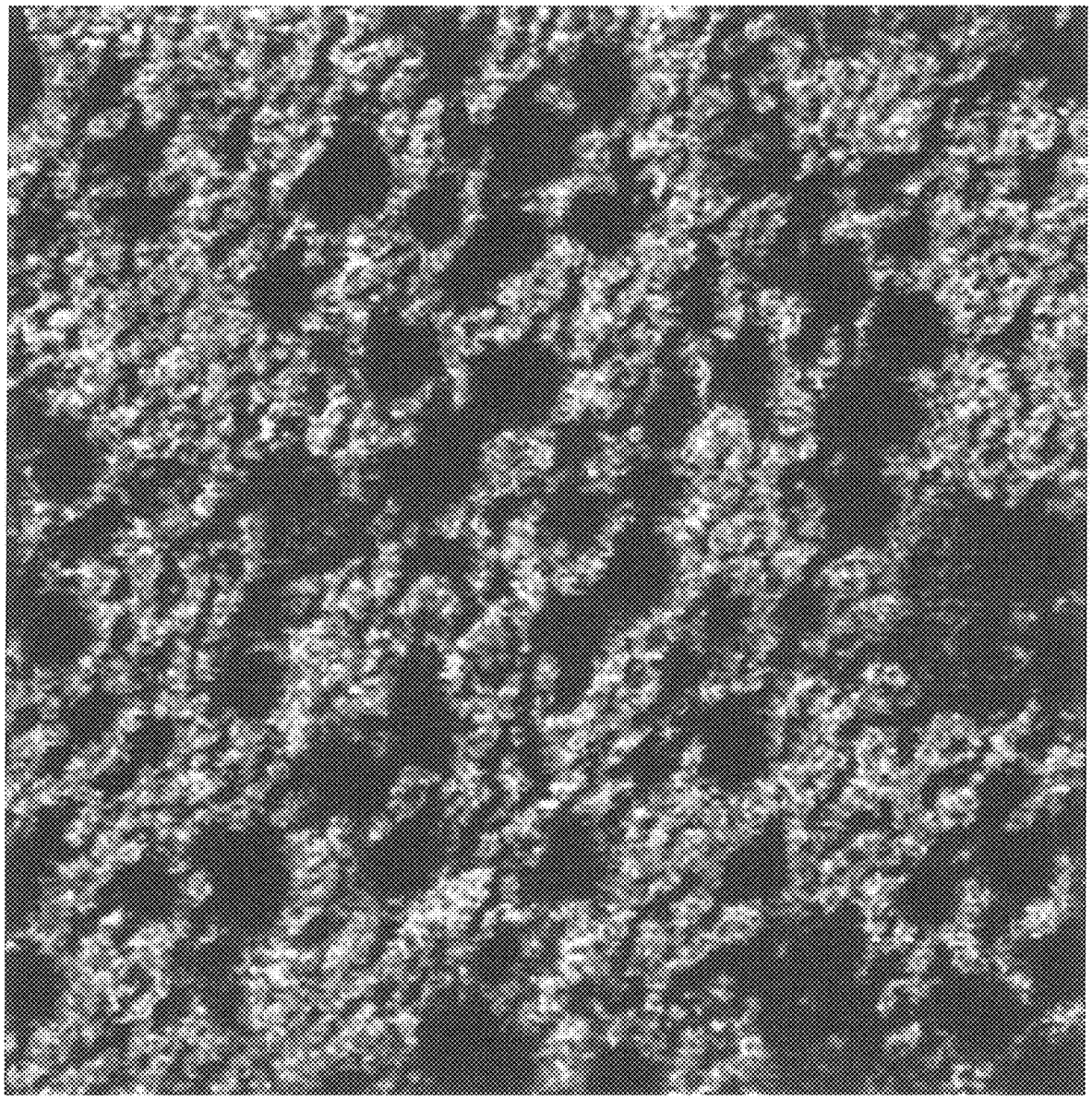
FIG. 6 is an atomic force microscopy (AFM) image of a core-shell particle according to the present invention.

Moreover, an atomic force microscopy (AFM) image of the polymer particle formed in Example 3 is shown in FIG. 6. The image depicts the modulus of the surface of the sample. Darker areas have a lower modulus and lighter areas have a higher modulus. The dark circular areas are the low modulus polymeric cores of the core-shell particles and the light areas immediately surrounding the darker areas are the high modulus polymeric shells. The AFM image was determined using a Dimension Icon equipped with an RTESPA-150 probe available from the Bruker Corporation, Billerica, Mass., USA. The equipment was operated according the procedure in the Dimension Icon instruction manual 004-1023-000. Samples of dried polymers were microtomed with an RMC AFM-990 microtome available from Boeckler Instruments, Inc., Tucson, Ariz., USA.

Example 4

Preparation of Polyester

A polyester was prepared according to Example A1 of EP 1,454,971 B1 as follows: In a reactor equipped with a stirrer, a water separator and a control unit for the temperature, the following components were mixed and heated to 185° C.: 1732 grams of TERATHANE® (polytetramethylene ether glycol having a number average molecular weight of 650 g/mol, commercially available from DuPont), and 307 grams of trimellitic anhydride. Upon reaching a carboxyl group content of 0.713 mmol/g (acid number=40 mg KOH/g), the reaction temperature is lowered to 175° C. The reaction is continued until reaching a carboxyl group content of 0.535 mmol/g (acid number=30 mg KOH/g). The Gardner-Holdt viscosity of the resin solution at 60% strength in butoxyethanol was V. After cooling, the polyester melt to 85° C., 552 grams of a 10% aqueous dimethylethanolamine solution was added followed by 2390 grams of deionized water. A finely divided dispersion was formed having a nonvolatile content of 40% and an acid number of 29 mg KOH/g.

Example 5

Preparation of a Hydrazide Functional Polyurethane

Part A: An isocyanate functional polyurethane was first prepared by charging the following components into a four necked round bottom flask fitted with a thermocouple, mechanical stirrer, and condenser: 209 grams of methylethyl ketone (MEK), 497.7 grams of FOMREZ® 66-56 (hydroxyl terminated saturated linear polyester polyol, commercially available from Chemtura), 75 grams of dimethylol propionic acid (DMPA), and 3.6 grams of triethylamine. The mixture was heated to 50° C. and held for 15 minutes. Next, 333 grams of isophorone diisocyanate was charged into the flask over 10 minutes, and mixed for 15 minutes. After mixing, 40 grams of MEK and 1.5 grams of dibutyl tin dilaurate (DBTDL) was charged into the flask and immediate exotherm was observed. After exotherm subsided, the mixture was heated to 90° C. and held for 60 minutes. The NCO equivalent weight was measured to be 899. The resulting mixture was kept at 60° C. before being dispersed into water.

Part B: An aqueous dispersion of hydrazide functional polyurethanes was prepared by charging the following components into a four necked round bottom flask fitted with a thermocouple, mechanical stirrer, and condenser at room temperature: 2200 grams of deionized water, 47 grams of dimethyl ethanolamine, and 150 grams of adipic acid dihydrazide. Next, 1100 grams of the isocyanate functional polyurethane made in Part A was dispersed into the flask over 20 minutes. The mixture was then heated up to 60° C. and mixed for an additional 30 minutes. Vacuum was applied to strip off 290 grams of MEK and water. After being cooled to 40° C., 1.0 gram of FOAMKILL® 649 (non-silicone defoamer, commercially available from Crucible Chemical Company), 13 grams of ACTICIDE® MBS (microbiocide formed of a mixture of 1,2-benzisothiazolin-3-one and 2-methyl-4-isothiazolin-3-one, commercially available from Thor GmbH), and 30 grams of deionized water were charged and mixed for an additional 15 minutes. The resulting dispersion was filtered via a 10 µm bag. The final dispersion had a non-volatile content of 34.7%.

Example 6

Preparation of a Hydrazide Functional Polyurethane-Acrylic Dispersion

A hydrazide-functional polyurethane-acrylic core-shell particle dispersion was prepared in a four-neck round bottom flask equipped with an electronic temperature probe, mechanical stirrer, condenser, and a heating mantle with the components listed in Table 6.

TABLE 6

| Component | Amount (grams) |
|---|---|
| Charge A | |
| Polyester prepolymer of Part A of Example 3 | 282.7 |
| Dimethylolpropionic acid (DMPA) | 45.3 |
| Hydroxyethyl methacrylate (HEMA) | 8.2 |
| 1,3-bis(2-hydroxyethoxy) benzene | 120.8 |
| Butylated hydroxytoluene (Ionol) | 0.75 |
| Charge B | |
| Butyl acrylate (BA) | 143.7 |
| Ethylene glycol dimethacrylate (EGDMA) | 21.0 |
| Charge C | |
| Toluene diisocyanate (TDI) | 242.3 |
| Charge D | |
| Butyl acrylate (BA) | 24.2 |
| Charge E | |
| Water | 869.2 |
| Dimethylethanolamine (DMEA) | 24.4 |
| Adipic dihydrazide | 50.0 |
| Charge F | |
| Water | 148.4 |
| Charge G | |
| Water | 15.3 |
| t-Butyl hydroperoxide (70%) | 1.53 |
| Charge H | |
| Water | 23.7 |
| Ferrous ammonium sulfate | 0.0085 |
| Sodium metabisulfite | 2.30 |
| Dimethylethanolamine (DMEA) | 1.61 |
| Charge I | |
| Water | 3.5 |
| PROXEL ® GXL [5] | 1.8 |

Charge A was stirred in the flask at 90° C. for thirty minutes. Charge B was added and the mixture was adjusted to 55° C. Charge C was then added over 20 minutes. Charge D was used to rinse the addition funnel used for Charge C. The reaction mixture was held at 90° C. for two hours. Charge E was next heated in a separate 5 liter three-neck flask to 80° C. The, 800 grams of the reaction product of charges A, B, C, and D was added to charge E over a 10 minute period. The mixture was cooled to 30° C. and a nitrogen atmosphere was established and maintained in the flask for the remainder of the reaction. Charges F and G were added to the reaction flask followed by a thirty minute addition of Charge H. The temperature rose exothermically to 45° C. and charge I was added to the mixture. The final dispersion had a Brookfield viscosity of 341 centipoise, an acid value of 9.2, a pH of 7.62, and a nonvolatile content of 44.5%.

Example 7

Preparation of a Hydrazide Functional Polyurethane-Acrylic Dispersion

A hydrazide-functional polyurethane-acrylic core-shell particle dispersion was prepared in a four-neck round bottom flask equipped with an electronic temperature probe, mechanical stirrer, condenser, and a heating mantle with the components listed in Table 7.

TABLE 7

| Component | Amount (grams) |
|---|---|
| Charge A | |
| Polyester prepolymer of Part A of Example 3 | 455.3 |
| Dimethylolpropionic acid (DMPA) | 45.5 |
| Hydroxyethyl methacrylate (HEMA) | 8.2 |
| 1,3-bis(2-hydroxyethoxy) benzene | 15.2 |
| Butylated hydroxytoluene (Ionol) | 0.76 |
| Charge B | |
| Butyl acrylate (BA) | 151.3 |
| Ethylene glycol dimethacrylate (EGDMA) | 21.1 |
| Charge C | |
| Toluene diisocyanate (TDI) | 174.2 |
| Charge D | |
| Butyl acrylate (BA) | 17.4 |
| Charge E | |
| Water | 873.2 |
| Dimethylethanolamine (DMEA) | 24.5 |
| Adipic dihydrazide | 53.9 |
| Charge F | |
| Water | 15.4 |
| t-Butyl hydroperoxide (70%) | 1.54 |
| Charge G | |
| Water | 23.9 |
| Ferrous ammonium sulfate | 0.0085 |
| Sodium metabisulfite | 2.31 |
| Dimethylethanolamine (DMEA) | 1.62 |
| Charge H | |
| Water | 3.5 |
| PROXEL ® GXL [5] | 1.8 |

Charge A was stirred in the flask at 90° C. for thirty minutes. Charge B was added and the mixture was adjusted to 55° C. Charge C was then added over 20 minutes. Charge D was used to rinse the addition funnel used for Charge C. The reaction mixture was held at 90° C. for two hours. Charge E was next heated in a separate 5 liter three-neck flask to 80° C. The, 800 grams of the reaction product of charges A, B, C, and D was added to charge E over a 20 minute period. The mixture was cooled to 30° C. and a nitrogen atmosphere was established and maintained in the flask for the remainder of the reaction. Charges F was added to the reaction flask followed by a thirty minute addition of Charge G. The temperature rose exothermically to 40° C.

and charge H was added to the mixture. The final dispersion had a Brookfield viscosity of 1500 centipoise, an acid value of 10.0, a pH of 7.33, and a nonvolatile content of 44.6%.

Example 8

Preparation of an Epoxy Functional Polyester

An epoxy functional polyester was prepared from the components listed in Table 8.

TABLE 8

| Component | Amount (grams) |
|---|---|
| Charge A | |
| MHHPA [6] | 948 |
| EPON ™ 828 [7] | 4054.7 |
| Charge B | |
| Capa ™ 2077A [8] | 2064.0 |
| Charge C | |
| EPON ™ 828 [7] | 395.9 |
| Triphenylphosphine | 46.4 |

[6] MHHPA is methylhexahydrophthalic anhydride, commercially available from Dixie Chemical.
[7] Difunctional bisphenol A/epichlorohydrin derived liquid epoxy resin, commercially available from HEXION SPECIALTY CHEMICALS.
[8] Polycaprolactone polyester diol, commercially available from Perstorp.

Charge A was added to a 12-liter, 4-necked kettle equipped with a motor driven stainless steel stir blade, a water-cooled condenser, a nitrogen blanket, and a heating mantle with a thermometer connected through a temperature feedback control device. The contents of the flask were heated to 90° C. and held for 30 minutes. Charge B was added and the reaction mixture was held at 90° C. for 30 minutes. Charge C was then added and the mixture was heated to 120° C. after exotherm. Then, the reaction mixture was held at 120° C. until the acid value was less than 2 mg KOH/g as determined with a Metrohm 798 MPT Titrino automatic titrator according to ASTM D 4662-15 and ASTM E 1899-16.

The reaction temperature was next cooled to 80° C. and the resin was poured out from the flask. The epoxy equivalent of the resulting epoxy functional polyester was 424 g/eq, and the weight average molecular weight by was 3670 g/mol.

Example 9

Preparation of an Epoxy Functional Polyester

An epoxy functional polyester was prepared from the components listed in Table 9.

TABLE 9

| Component | Amount (grams) |
|---|---|
| Charge A | |
| MHHPA [6] | 1038.6 |
| EPON ™ 828 [7] | 4439.3 |
| Charge B | |
| Capa ™ 4101 [9] | 1589.1 |

TABLE 9-continued

| Component | Amount (grams) |
|---|---|
| Charge C | |
| EPON ™ 828 [7] | 433.5 |
| Triphenylphosphine | 43.6 |

[9] Tetra-functional polyol terminated with primary hydroxyl groups, commercially available from Perstorp.

Charge A was added to a 12-liter, 4-necked kettle equipped with a motor driven stainless steel stir blade, a water-cooled condenser, a nitrogen blanket, and a heating mantle with a thermometer connected through a temperature feedback control device. The contents of the flask were heated to 90° C. and held for 30 minutes. Charge B was added and the reaction mixture was held at 90° C. for 30 minutes. Charge C was then added and the mixture was heated to 120° C. after exotherm. Then, the reaction mixture was held at 120° C. until the acid value was less than 2 mg KOH/g as determined by titration. The reaction temperature was cooled to 80° C. and the resin was poured out from the flask. The epoxy equivalent of the resulting epoxy functional polyester was 412 g/eq, and the weight average molecular weight was 18741 g/mol.

Example 10

Preparation of an Adhesion Promoter Blend

An adhesion promoter blend was prepared from the components listed in Table 10.

TABLE 10

| Component | Amount (grams) | Equivalent Weight (g/eq) | Epoxy Equivalence | Thiol Equivalence |
|---|---|---|---|---|
| Kane Ace MX-153 [10] | 26.5 | 270 | 0.098 | 0.0 |
| Resin of Example 8 | 4.2 | 423 | 0.010 | 0.0 |
| Resin of Example 9 | 4.9 | 410 | 0.012 | 0.0 |
| THIOCURE ® PETMP [11] | 13.8 | 127 | 0.0 | 0.109 |

[10] A core-shell poly(butadiene) rubber dispersion (33% rubber by weight) in unmodified liquid epoxy resin based on bisphenol-A, commercially available from Kaneka Texas Corporation.
[11] Pentaerythritol tetra(3-mercaptopropionate), commercially available from BRUNO BOCK Chemische Fabrik GmbH & Co. KG.

The adhesion promoter blend was prepared by combining the components listed in Table 10 in an appropriate sized container and mixing the components for the appropriate period of time.

Examples 11-14

Preparation and Evaluation of Coating Compositions

Several coating compositions were prepared with the materials previously described as shown in Table 11.

TABLE 11

| Ex. | PUD[13] | Latex[14] | Hydrazide[15] | Polyester[16] | Adhesion Blend[17] | Carbodiimide | Defoamer |
|---|---|---|---|---|---|---|---|
| 11[12] | 172.6 g | 38.3 g | 0.0 g | 10% | 0% | 7.5 g | 0.5 g |
| 12 | 153.5 g | 34.4 g | 0.0 g | 9% | 6% | 6.8 g | 0.5 g |
| 13 | 172.6 g | 28.7 g | 8.6 g | 10% | 6% | 7.6 g | 0.5 g |
| 14 | 153.5 g | 26.8 g | 8.6 g | 9% | 0% | 6.8 g | 0.5 g |

[12] A comparative example that does not include an adhesion promoter according to the present invention.
[13] The polyurethane dispersion prepared in Example 1.
[14] The Polyurethane-Acrylic Dispersion prepared in Example 2.
[15] The hydrazide functional polyurethane prepared in Example 5
[16] The polyester prepared in Example 4.
[17] The adhesion promoter blend prepared in Example 10.

The coating compositions of examples 11-14 were prepared by combining the components listed in Table 11 in an appropriate sized container for 15 minutes. The carbodiimide used was CARBODILITE® V-02-L2 (waterborne carbodiimide crosslinker, commercially available from Nisshinbo Chemical, Inc.) and the defoamer used was FOAMASTER® MO 2111 (defoamer, commercially available from BASF Corporation). Each mixture was then allowed to stand (equilibrate) overnight (about 12 to 16 hours).

After preparing the coating compositions, a sheet of rubber was scuffed with sandpaper, washed, and scrubbed with Clorox Clean-Up® (Clorox Company, Oakland Calif.) using a plastic-bristled brush, rinsed with water, and allowed to dry. The rubber sheet was then cut into several 2"×6" strips and attached to a metal sheet with glue (3M™ Scotch-Weld™ Epoxy Adhesive DP-460 EG, from 3M, St. Paul, Minn.). The coating compositions were then applied to the rubber strips. The coating compositions were allowed to stand for one hour at ambient conditions (room temperature of 20° C. to 25° C.) to release water, and then placed in an oven for 10 minutes at 49° C. The temperature in the oven was increased to 82° C. and the compositions were allowed to cure for 30 minutes.

The resulting coatings were tested for adhesion on an Instron Model 4443 manufactured by Instron® and following the instructions contained in the Instron Model 4443 manual to measure peel strength of a rectangular sample 10 mm wide, peeled at 50 mm/minute, at an angle of 180° from the substrate. The adhesion of each coating is listed in Table 12 with higher N/mm representing better adhesion.

TABLE 12

| Example | Adhesion (N/mm) |
|---|---|
| 11 [12] | 2.1 |
| 12 | 4.1 |
| 13 | 10.0 |
| 14 | 5.0 |

As shown in Table 12, the coatings of Examples 12-14 that included the adhesion promoters of the present invention exhibited better adhesion as compared to comparative Example 11. Further, the coating of Example 13 that included both the adhesion blend and the polymeric hydrazide exhibited a synergistic effect to provide the best adhesion.

Examples 15-16

Preparation and Evaluation of Coating Compositions

Two coating compositions were prepared with the materials previously described as shown in Table 13.

TABLE 13

| Ex. | Latex[18] | Hydrazide[15] | Polyester[16] | Adhesion Blend[17] | Carbodiimide | Defoamer |
|---|---|---|---|---|---|---|
| 15 | 167.3 g | 8.5 g | 28.6 g | 10.0 g | 7.5 g | 1.0 g |
| 16 | 176.5 g | 8.5 g | 28.6 g | 6.0 g | 7.5 g | 1.0 g |

[18] The latex prepared in Example 3.

The coating compositions of examples 15 and 16 were prepared by combining the components listed in Table 13 in an appropriate sized container for 15 minutes. The carbodiimide used was CARBODILITE® V-02-L2 (waterborne carbodiimide crosslinker, commercially available from Nisshinbo Chemical, Inc.) and the defoamer used was FOAMASTER® MO 2111 (defoamer, commercially available from BASF Corporation). Each mixture was then allowed to stand (equilibrate) overnight (about 12 to 16 hours).

After preparing the coating compositions, a rubber sheet was cut into several 2"×6" strips and attached to a metal sheet with glue (3M™ Scotch-Weld™ Epoxy Adhesive DP-460 EG, from 3M, St. Paul, Minn.). The coating compositions were then applied to the rubber strips. The coating compositions were allowed to stand for one hour at ambient conditions (room temperature of 20° C. to 25° C.) to release water, and then placed in an oven for 10 minutes at 49° C. The temperature in the oven was increased to 82° C. and the compositions were allowed to cure for 30 minutes. The rubbers strips were not cleaned or scuffed.

The resulting coatings were tested for adhesion on an Instron Model 4443 manufactured by Instron® and following the instructions contained in the Instron Model 4443 manual to measure peel strength of a rectangular sample 10 mm wide, peeled at 50 mm/minute, at an angle of 180° from the substrate. The adhesion of each coating is listed in Table 14 with higher N/mm representing better adhesion.

TABLE 14

| Example | Adhesion (N/mm) |
|---------|-----------------|
| 15      | 5.0             |
| 16      | 1.5             |

As shown in Table 14, the coating of Example 15, which included a larger amount of the adhesion blend, exhibited better adhesion on rubber strips that were not cleaned or scuffed.

Examples 17-18

Preparation and Evaluation of Coating Compositions

Two coating compositions were prepared with the materials previously described as shown in Table 15.

TABLE 15

| Ex. | Latex[18] | Hydrazide[19] | Polyester[16] | Adhesion Blend[17] | Carbodiimide | Defoamer |
|-----|-----------|---------------|---------------|--------------------|--------------|----------|
| 17  | 186.8 g   | 8.5 g         | 28.7 g        | 6.0 g              | 7.5 g        | 1.0 g    |
| 18  | 183.2 g   | 11.2 g        | 28.7 g        | 6.0 g              | 7.5 g        | 1.0 g    |

[19]The dispersion comprising hydrazide functional polyurethane-acrylic prepared in Example 6 was used for the preparation of Example 17, and the dispersion comprising hydrazide functional polyurethane-acrylic prepared in Example 7 was used for the preparation of Example 18.

The coating compositions of examples 17 and 18 were prepared by combining the components listed in Table 15 in an appropriate sized container for 15 minutes. The carbodiimide used was CARBODILITE® V-02-L2 (waterborne carbodiimide crosslinker, commercially available from Nisshinbo Chemical, Inc.) and the defoamer used was FOA-MASTER® MO 2111 (defoamer, commercially available from BASF Corporation). Each mixture was then allowed to stand (equilibrate) overnight (about 12 to 16 hours).

After preparing the coating compositions, a rubber sheet was cut into several 2"×6" strips and attached to a metal sheet with glue (3M™ Scotch-Weld™ Epoxy Adhesive DP-460 EG, from 3M, St. Paul, Minn.). The coating compositions were then applied to the rubber strips. The coating compositions were allowed to stand for one hour at ambient conditions (room temperature of 20° C. to 25° C.) to release water, and then placed in an oven for 10 minutes at 49° C. The temperature in the oven was increased to 82° C. and the compositions were allowed to cure for 30 minutes. The rubbers strips were not cleaned or scuffed.

The resulting coatings were tested for adhesion on an Instron Model 4443 manufactured by Instron® and following the instructions contained in the Instron Model 4443 manual to measure peel strength of a rectangular sample 10 mm wide, peeled at 50 mm/minute, at an angle of 180° from the substrate. The adhesion of each coating is listed in Table 16 with higher N/mm representing better adhesion.

TABLE 16

| Example | Adhesion (N/mm) |
|---------|-----------------|
| 17      | 2.2             |
| 18      | 2.0             |

Example 19

Preparation and Evaluation of a Multi-Layer Coating

A coating composition was first prepared combining the aqueous dispersion of the polyurethane prepared in Example 1, 38.7 grams of the polyurethane-acrylic dispersion prepared in Example 2, 28.6 grams of the polyester prepared in Example 4, 7.5 grams of CARBODILITE® V-02-L2 (waterborne carbodiimide crosslinker, commercially available from Nisshinbo Chemical, Inc.) and 0.5 grams of FOA-MASTER® MO 2111 (defoamer, commercially available from BASF Corporation) in an appropriate sized container for 15 minutes. The mixture was then allowed to stand (equilibrate) overnight (about 12 to 16 hours).

After preparing the coating composition, a sheet of rubber was scuffed with sandpaper, washed, and scrubbed with Clorox Clean-Up® (Clorox Company, Oakland Calif.) using a plastic-bristled brush, rinsed with water, and allowed to dry. The rubber sheet was then cut into several 2"×6" strips and attached to a metal sheet with glue (3M™ Scotch-Weld™ Epoxy Adhesive DP-460 EG, from 3M, St. Paul, Minn.).

Next, the adhesion promoter blend of Example 10 was dissolved in acetone, applied to the rubber substrate and allowed to flash for 5 minutes. The coating composition previously described was then applied over the adhesive coating derived from the adhesion promoter blend. The resulting multi-layer system was allowed to stand for one hour at ambient conditions (room temperature of 20° C. to 25° C.) to release water, then placed in an oven for 10 minutes at 49° C. The temperature in the oven was increased to 82° C., and the coating was allowed to cure for 30 minutes.

The resulting coating was tested for adhesion on an Instron Model 4443 manufactured by Instron® following the instructions contained in the Instron Model 4443 manual to measure peel strength of a rectangular sample 10 mm wide, peeled at 50 mm/minute, at an angle of 180° from the substrate, and exhibited an adhesion of 5.1 N/mm.

Example 20

Preparation and Evaluation of a Coating Composition

A coating composition was first prepared by dissolving 4.41 grams of the adhesion promoter blend prepared in example 10 in acetone. Next, 170.5 g of the polyurethane prepared in Example 1, 38.7 grams of the polyurethane-acrylic dispersion prepared in Example 2, 28.6 grams of the polyester prepared in Example 4, 7.5 grams of CARBODI-LITE® V-02-L2 (waterborne carbodiimide crosslinker, commercially available from Nisshinbo Chemical, Inc.), 0.5 grams of FOAMASTER® MO 2111 (defoamer, commercially available from BASF Corporation), 43.5 grams of EH-801 CPO (supplied by TOYOBO CO., LTD.), and the adhesion promoter blend dissolved in acetone were combined and mixed in an appropriate sized container for 15 minutes. The mixture was allowed to stand (equilibrate) overnight (about 12 to 16 hours).

After preparing the coating composition, a sheet of rubber was scuffed with sandpaper, washed, and scrubbed with Clorox Clean-Up® (Clorox Company, Oakland Calif.) using a plastic-bristled brush, rinsed with water, and allowed to dry. The rubber sheet was then cut into several 2"×6" strips and attached to a metal sheet with glue (3M™ Scotch-Weld™ Epoxy Adhesive DP-460 EG, from 3M, St. Paul, Minn.). The coating composition was then applied to the rubber strips. The coating composition was allowed to stand for one hour at ambient conditions (room temperature of 20° C. to 25° C.) to release water, and then placed in an oven for 10 minutes at 49° C. The temperature in the oven was increased to 82° C. and the composition was allowed to cure for 30 minutes.

The resulting coating was tested for adhesion on an Instron Model 4443 manufactured by Instron® following the instructions contained in the Instron Model 4443 manual to measure peel strength of a rectangular sample 10 mm wide, peeled at 50 mm/minute, at an angle of 180° from the substrate, and exhibited an adhesion of 5.9 N/mm.

Examples 21-22

Preparation and Evaluation of a Coating Composition with a White Decorative Component Two (2) coating compositions according to the present invention were prepared from the components listed in Table 17.

TABLE 17

| Component | Example 21 Amount (grams) | Example 22 Amount (grams) |
|---|---|---|
| Polyurethane Dispersion of Example 1 | 32.19 | 21.80 |
| FOAMASTER ® MO 2111 [20] | 0.22 | 0.15 |
| Latex of Example 2 | 7.00 | 4.74 |
| Hydrazide Dispersion of Example 5 | 1.88 | 1.27 |
| Polyester Dispersion of Example 4 | 6.29 | 4.26 |
| CARBODILITE ® V-02-L2 [21] | 1.65 | 1.11 |
| White tint paste [22] | 31.17 | 21.11 |
| VINNAPAS ® 323 [23] | 0.00 | 28.11 |
| BYK-348 [24] | 0.16 | 0.11 |
| Deionized water | 10.12 | 6.85 |

TABLE 17-continued

| Component | Example 21 Amount (grams) | Example 22 Amount (grams) |
|---|---|---|
| Adhesion promoter blend [17] | 1.32 | 0.89 |
| Deionized water | 8.00 | 9.59 |

[20] Defoamer, commercially available from BASF Corporation.
[21] Waterborne carbodiimide crosslinker, commercially available from Nisshinbo Chemical, Inc.
[22] Rutile titanium dioxide (available from E. I. DuPont de Nemours and Company as R 900-39) dispersed in a resin blend of 37.0% waterborne acrylic resin (8.5% hydroxyethyl acrylate, 18.0% butyl methacrylate, 30.0% styrene, 35.0% butyl acrylate, 8.5% acrylic acid made at 27.0% solids), 38.4% acrylic-polyester-urethane latex [3.0% ethylene glycol dimethacrylate, 11.0% methyl methacrylate, 24% butyl acrylate, 2% acrylic acid, and 60% polyester-acrylic-urethane (neopentyl glycol, adipic acid, and hydroxyethyl acrylate-butyl acrylate, 1,6-hexamethylene diisocyanate) made at 43.5% solids] and 24.6% polypropylene glycol 425. The dispersion has a 69.5% weight solids content and a pigment to binder ratio of 6.71.
[23] A poly(vinyl alcohol) stabilized vinyl acetate-ethylene copolymer dispersion with a glass transition temperature (Tg) of +23° C., commercially available from Wacker Chemie AG.
[24] Silicone surfactant, commercially available from BYK.

The components listed in Table 19 were added in order, except for the adhesion promoter blend, and mixed using a paddle blade. The adhesion promoter was combined 24 hours after the remaining components had been mixed. Prior to spray application, additional deionized water was added as listed in the last line of Table 19.

After preparing the coating compositions, tire sidewall rubber samples were scuffed with a 220 grit sandpaper, cleaned with a commercially available chemical solution (Clorox Clean-Up® from the Clorox Company) using a hard bristle brush, rinsed with water, and dried thoroughly with compressed air. Samples for peel strength testing were fixed to steel panels using a commercially available epoxy glue (3M Scotch Weld DP460) and allowed to cure for 12 hours.

The coating compositions were sprayed onto the rubber substrates and steel panels with a 1.8 mm nozzle Binks® 95 siphon feed hand gun to achieve dry film build between 150 μm and 250 μm. For samples prepared for peel strength testing, fine woven organza fabric was dipped into the remaining formulated coating mixture and applied to the wet coated rubber substrate using a tongue depressor before cure. An additional, uncleaned tire sidewall sample without mesh was also sprayed with the coatings for monitoring discoloration of the coatings, and an electrocoated steel panel was sprayed with the coatings for abrasion resistance testing. Coated samples were left for 1 hour at ambient temperature. Subsequently, the samples were dehydrated for 10 minutes at 50° C. and then cured for approximately 5 hours at 82° C.

Peel strength testing: the coatings that were prepared for peel strength testing were scored into 10 mm wide strips. The top of the substrate and individual fabric strips were taped and placed into the jaws of an Instron® mini 44. A 180° peel test was performed using the Instron® mini 44, which pulls a 10 mm wide sample at 50 mm/minute from the substrate at a 180° angle from the substrate. Samples were run until 90 mm extension was reached. The average load per width for three runs was reported for each sample. The results are listed in Table 18.

TABLE 18

| Coating | Average Peel Strength |
|---|---|
| Example 21 | 3.61 |
| Example 22 | 3.45 |

Abrasion resistance testing: coatings that were applied onto 4"×4" rubber substrate were prepared by punching a ⅝" hole in the center of the panel. The sample was then mounted on a flat turntable platform that rotates on a vertical axis at a fixed speed (Taber Rotary Platform Abrasion Tester). Two abrasive wheels, which are covered in sand paper, were lowered onto the substrate surface at a specific pressure. As the turntable rotated (72 rpm), the wheels tracked over the sample in opposite directions generating a circular path of wear. A 500 cycle program was performed on each sample. The wear cycles per μm of coating was calculated using the film build lost after abrasion with Equation 1:

$$\text{Wear cycles per } \mu m = \frac{\text{Number of cycles}}{\left(\begin{array}{l}\text{film thickness of unabraded coating}-\\ \text{film thickness of abraded coating}\end{array}\right)}$$

The results of the abrasion resistance testing are listed in Table 19.

TABLE 19

| Coating | Film thickness (μm) | | Wear cycles per μm coating |
|---|---|---|---|
| | Initial | After 500 cycles | |
| Example 21 | 168 | 26 | 3.5 |
| Example 22 | 236 | 113 | 4.1 |

Discoloration testing: Coatings that were applied to uncleaned rubber substrates were evaluated for discoloration. Color was evaluated using an X-Rite Ci7800 spectrophotometer to measure L*, a*, and b* values, which define coordinates in color space. Delta E (ΔE) was used to calculate the difference between the original coating color after cure and over several days according to Equation 2:

$$\Delta E = \sqrt{(\Delta L^*)^2 + (\Delta a^*)^2 + (\Delta b^*)^2}.$$

Measurements were collected for coatings that were aged at ambient temperature under fluorescent lighting. Values of L*, a*, and b* collected using spectral excluded (SCE) color data were used for the calculation of Delta E. For Delta E, a small value (<1) indicates there is no perceptible difference in color while larger values indicate a perceptible color change. The results are listed in Table 20 with lower Delta E values representing less yellowing.

TABLE 20

| Coating | Delta E values by day | | | |
|---|---|---|---|---|
| | 2 | 3 | 5 | 6 |
| Example 21 | 4.1 | 4.4 | 4.2 | 5.9 |
| Example 22 | 1.8 | 2.7 | 2.0 | 2.7 |

In view of the foregoing the present invention is directed to the following non-limiting clauses:

Clause 1: A coating composition comprising: a polymer comprising: (i) a barrier segment comprising aromatic groups and urethane linkages, urea linkages, or a combination thereof; and (ii) an elastomeric segment that is different from (i), wherein the barrier segment comprises at least 30 weight % of the polymer based on the total solids weight of the polymer; and an adhesion promoter comprising: (a) at least one epoxy functional polymer and a thiol functional crosslinker reactive with the epoxy functional polymer; and/or (b) a hydrazide functional component.

Clause 2: The coating composition of clause 1, wherein the elastomeric segment comprises ester linkages, ether linkages, sulfide linkages, natural rubber, synthetic rubber, or a combination of any of the foregoing.

Clause 3: The coating composition of any one of clause 1 or clause 2, further comprising aqueous dispersed core-shell particles, wherein the core-shell particles comprise a polymeric core comprising an acrylic polymer, a vinyl polymer, or a combination thereof that is at least partially encapsulated by a polymeric shell comprising urethane linkages, urea linkages, or a combination thereof, and wherein at least a portion of the polymeric shell is covalently bonded to at least a portion of the polymeric core.

Clause 4: The coating composition of any of clauses 1 to 3, further comprising an additional crosslinker reactive with the polymer comprising a barrier segment and an elastomeric segment.

Clause 5: The coating composition of any of clauses 1 to 4, wherein the polymer comprising a barrier segment and an elastomeric segment is comprised by core-shell particles present in the coating composition, wherein the polymer comprising a barrier segment and an elastomeric segment forms a polymeric shell that at least partially encapsulates a polymeric core comprising an acrylic polymer, a vinyl polymer, or a combination thereof, and wherein at least a portion of the polymeric shell is covalently bonded to at least a portion of the polymeric core.

Clause 6: The coating composition of clause 5, wherein the polymeric shell comprises at least 75 weight % of the core-shell particles based on the total solids weight of the core-shell particles.

Clause 7: The coating composition of any of clauses 1 to 6, wherein the adhesion promoter comprises the at least one epoxy functional polymer and thiol functional crosslinker.

Clause 8: The coating composition of clause 7, wherein the adhesion promoter comprises: (1) a polymer comprising aromatic groups, hydroxyl groups, and two or more epoxy groups per molecule; (2) an epoxy functional polymer mixed with core-shell rubber particles; or a combination thereof.

Clause 9: The coating composition of clause 8, wherein the adhesion promoter comprises at least two, preferably all, of the following: (1) a polymer comprising aromatic groups, hydroxyl groups, and two epoxy groups per molecule; (2) a polymer comprising aromatic groups, hydroxyl groups, and greater than two epoxy groups per molecule; and (3) an epoxy functional polymer mixed with core-shell rubber particles.

Clause 10: The coating composition of any of clauses 7 to 9, wherein the equivalent ratio of epoxy functional groups to thiol functional groups is selected within a range of from 0.03:1 to 2:1.

Clause 11: The coating composition of any of clauses 1 to 10, wherein the adhesion promoter comprises the hydrazide functional component.

Clause 12: The coating composition of clause 11, wherein the hydrazide functional component comprises a polymeric material comprising two or more hydrazide functional groups per molecule.

Clause 13: The coating composition of clause 12, wherein the polymeric material having hydrazide groups is comprised by core-shell particles present in the coating composition, the core-shell particles comprising (1) a polymeric core at least partially encapsulated by (2) a polymeric shell comprising hydrazide functional groups, wherein the polymeric core is covalently bonded to at least a portion of the polymeric shell.

Clause 14: The coating composition of any of clauses 1 to 13, wherein the adhesion promoter comprises both (a) the at least one epoxy functional polymer and thiol functional crosslinker and (b) the hydrazide functional component.

Clause 15: The coating composition of any of clauses 1 to 14, further comprising an additional polymer selected from a polyester, a polyether, a polysulfide, natural rubber, synthetic rubber, or a copolymer thereof, or a combination of any of the foregoing.

Clause 16: The coating composition of any of clauses 1 to 15, further comprising a decorative component, wherein the decorative component comprises a pigment, such as a white pigment, and a resin, such as an acrylic resin, dispersed in an aqueous medium.

Clause 17: A multi-layer elastic barrier coating comprising: (a) an adhesive coating layer applied over at least a portion of a substrate, wherein the adhesive coating layer is formed from a coating composition comprising at least one polymer comprising two or more epoxy functional groups and a thiol functional crosslinker reactive with the epoxy functional polymer; and (b) an elastic barrier coating layer applied over at least a portion of the adhesive coating layer, wherein the elastic barrier coating layer is formed from a coating composition comprising a polymer comprising: (i) a barrier segment comprising aromatic groups and urethane linkages, urea linkages, or a combination thereof; and (ii) an elastomeric segment that is different from (i), wherein the barrier segment comprises at least 30 weight % of the polymer based on the total solids weight of the polymer.

Clause 18: The multi-layer elastic barrier coating of clause 17, wherein the elastomeric segment comprises ester linkages, ether linkages, sulfide linkages, natural rubber, synthetic rubber, or a combination of any of the foregoing.

Clause 19: The multi-layer elastic barrier coating of clause 17 or 18, wherein the coating composition that forms the elastic barrier coating further comprises aqueous dispersed core-shell particles, wherein the core-shell particles comprise a polymeric core comprising an acrylic polymer, a vinyl polymer, or a combination thereof that is at least partially encapsulated by a polymeric shell comprising urethane linkages, urea linkages, or a combination thereof, and wherein at least a portion of the polymeric shell is covalently bonded to at least a portion of the polymeric core.

Clause 20: The multi-layer elastic barrier coating of any one of clauses 17 to 19, wherein the coating composition that forms the elastic barrier coating further comprises a crosslinker reactive with the polymer comprising a barrier segment and an elastomeric segment.

Clause 21: The multi-layer elastic barrier coating of any of clauses 17 to 20, wherein the polymer comprising a barrier segment and an elastomeric segment is comprised by core-shell particles present in the coating composition that forms the elastic barrier coating, wherein the polymer comprising a barrier segment and an elastomeric segment forms a polymeric shell that at least partially encapsulates a polymeric core comprising an acrylic polymer, a vinyl polymer, or a combination, and wherein at least a portion of the polymeric shell is covalently bonded to at least a portion of the polymeric core.

Clause 22: The multi-layer elastic barrier coating of any of clauses 19 or 21, wherein the polymeric shell comprises at least 75 weight % of the core-shell particles based on the total solids weight of the core-shell particles.

Clause 23: The multi-layer elastic barrier coating of any of clauses 17 to 22, wherein the at least one epoxy functional polymer comprises: (1) a polymer comprising aromatic groups, hydroxyl groups, and two or more epoxy groups per molecule; (2) an epoxy functional polymer mixed with core-shell rubber particles; or a combination thereof.

Clause 24: The multi-layer elastic barrier coating of any of clause 23, wherein the at least one epoxy functional polymer comprises at least two, preferably all, of the following: (1) a polymer comprising aromatic groups, hydroxyl groups, and two epoxy groups per molecule; (2) a polymer comprising aromatic groups, hydroxyl groups, and greater than two epoxy groups per molecule; and (3) an epoxy functional polymer mixed with core-shell rubber particles.

Clause 25: The multi-layer elastic barrier coating of any of clauses 17 to 24, wherein at least one of (a) the coating composition that forms the elastic barrier coating and (b) the coating compositions that forms the adhesive coating layer further comprises a hydrazide functional component, wherein the hydrazide functional component preferably comprises a polymeric material comprising two or more hydrazide functional groups per molecule.

Clause 26: The multi-layer elastic barrier coating of any of clauses 17 to 25, wherein the coating composition that forms the elastic barrier coating further comprises an additional polymer selected from a polyester, a polyether, a polysulfide, natural rubber, synthetic rubber, or a copolymer thereof, or a combination of any of the foregoing.

Clause 27: The multi-layer elastic barrier coating of any of clauses 17 to 26, wherein the coating composition that forms the elastic barrier coating further comprises a decorative component, wherein the decorative component comprises a pigment, such as a white pigment, and a resin, such as an acrylic resin, dispersed in an aqueous medium.

Clause 28. A substrate at least partially coated with a coating formed from the coating composition according to any one of clauses 1 to 16 or with a multi-layer coating according to any one of clauses 17 to 27.

Whereas particular embodiments of this invention have been described above for purposes of illustration, it will be evident to those skilled in the art that numerous variations of the details of the present invention may be made without departing from the invention as defined in the appended claims.

The invention claimed is:

1. A coating composition comprising:
a polymer comprising: (i) a barrier segment comprising aromatic groups and urethane linkages, urea linkages, or a combination thereof; and (ii) an elastomeric segment that is different from (i), wherein the barrier segment comprises at least 30 weight % of the polymer based on the total solids weight of the polymer; and
an adhesion promoter comprising: (a) at least one epoxy functional polymer and a thiol functional crosslinker reactive with the epoxy functional polymer; and/or (b) a hydrazide functional component.

2. The coating composition of claim 1, wherein the elastomeric segment comprises ester linkages, ether linkages, sulfide linkages, natural rubber, synthetic rubber, or a combination of any of the foregoing.

3. The coating composition of claim 1, further comprising aqueous dispersed core-shell particles, wherein the core-shell particles comprise a polymeric core comprising an acrylic polymer, a vinyl polymer, or a combination thereof that is at least partially encapsulated by a polymeric shell comprising urethane linkages, urea linkages, or a combination thereof, and wherein at least a portion of the polymeric shell is covalently bonded to at least a portion of the polymeric core.

4. The coating composition of claim 1, further comprising an additional crosslinker reactive with the polymer comprising the barrier segment and the elastomeric segment.

5. The coating composition of claim 1, wherein the polymer comprising the barrier segment and the elastomeric segment is comprised by core-shell particles present in the coating composition, wherein the polymer comprising a barrier segment and an elastomeric segment forms a polymeric shell that at least partially encapsulates a polymeric core comprising an acrylic polymer, a vinyl polymer, or a combination thereof, and wherein at least a portion of the polymeric shell is covalently bonded to at least a portion of the polymeric core.

6. The coating composition of claim 5, wherein the polymeric shell comprises at least 75 weight % of the core-shell particles based on the total solids weight of the core-shell particles.

7. The coating composition of claim 1, wherein the adhesion promoter comprises the at least one epoxy functional polymer and thiol functional crosslinker.

8. The coating composition of claim 7, wherein the adhesion promoter comprises: (1) a polymer comprising aromatic groups, hydroxyl groups, and two or more epoxy groups per molecule; (2) an epoxy functional polymer mixed with core-shell rubber particles; or a combination thereof.

9. The coating composition of claim 7, wherein the adhesion promoter comprises at least two of the following: (1) a polymer comprising aromatic groups, hydroxyl groups, and two epoxy groups per molecule; (2) a polymer comprising aromatic groups, hydroxyl groups, and greater than two epoxy groups per molecule; and (3) an epoxy functional polymer mixed with core-shell rubber particles.

10. The coating composition of claim 7, wherein the adhesion promoter comprises all of the following: (1) a polymer comprising aromatic groups, hydroxyl groups, and two epoxy groups per molecule; (2) a polymer comprising aromatic groups, hydroxyl groups, and greater than two epoxy groups per molecule; and (3) an epoxy functional polymer mixed with core-shell rubber particles.

11. The coating composition of claim 7, wherein the equivalent ratio of epoxy functional groups to thiol functional groups is from 0.03:1 to 2:1.

12. The coating composition of claim 1, wherein the adhesion promoter comprises the hydrazide functional component.

13. The coating composition of claim 12, wherein the hydrazide functional component comprises a polymeric material comprising two or more hydrazide functional groups per molecule.

14. The coating composition of claim 13, wherein the polymeric material having hydrazide functionality is comprised by core-shell particles present in the coating composition, the core-shell particles comprising (1) a polymeric core at least partially encapsulated by (2) a polymeric shell comprising hydrazide functional groups, wherein the polymeric core is covalently bonded to at least a portion of the polymeric shell.

15. The coating composition of claim 1, wherein the adhesion promoter comprises both (a) the at least one epoxy functional polymer and thiol functional crosslinker and (b) the hydrazide functional component.

16. The coating composition of claim 1, further comprising an additional polymer selected from a polyester, a polyether, a polysulfide, natural rubber, synthetic rubber, or a copolymer thereof, or a combination of any one of the foregoing.

17. The coating composition of claim 1, further comprising a decorative component, wherein the decorative component comprises a pigment and a resin dispersed in an aqueous medium.

18. The coating composition of claim 17, wherein the pigment of the decorative component comprises a white pigment and the resin of the decorative component comprises an acrylic resin.

19. A substrate at least partially coated with a coating formed from the coating composition of claim 1.

20. A multi-layer elastic barrier coating comprising:
(a) an adhesive coating layer to be applied over at least a portion of a substrate, wherein the adhesive coating layer is formed from a coating composition comprising at least one epoxy functional polymer and a thiol functional crosslinker reactive with the epoxy functional polymer; and
(b) an elastic barrier coating formed from the coating composition of claim 1 applied over at least a portion of the adhesive coating layer.

21. The multi-layer elastic barrier coating of claim 20, wherein the elastomeric segment comprises ester linkages, ether linkages, sulfide linkages, natural rubber, synthetic rubber, or a combination of any one of the foregoing.

22. The multi-layer elastic barrier coating of claim 20, wherein the coating composition that forms the elastic barrier coating further comprises aqueous dispersed core-shell particles, wherein the core-shell particles comprise a polymeric core comprising an acrylic polymer, a vinyl polymer, or a combination thereof that is at least partially encapsulated by a polymeric shell comprising urethane linkages, urea linkages, or a combination thereof, and wherein at least a portion of the polymeric shell is covalently bonded to at least a portion of the polymeric core.

23. The multi-layer elastic barrier coating of claim 20, wherein the coating composition that forms the elastic barrier coating further comprises a crosslinker reactive with the polymer comprising the barrier segment and the elastomeric segment.

24. The multi-layer elastic barrier coating of claim 20, wherein the polymer comprising the barrier segment and the elastomeric segment is comprised by core-shell particles present in the coating composition that forms the elastic barrier coating, wherein the polymer comprising a barrier segment and an elastomeric segment forms a polymeric shell that at least partially encapsulates a polymeric core comprising an acrylic polymer, a vinyl polymer, or a combination thereof, and wherein at least a portion of the polymeric shell is covalently bonded to at least a portion of the polymeric core.

25. The multi-layer elastic barrier coating of claim 24, wherein the polymeric shell comprises at least 75 weight % of the core-shell particles based on the total solids weight of the core-shell particles.

26. The multi-layer elastic barrier coating of claim 20, wherein the at least one epoxy functional polymer comprises: (1) a polymer comprising aromatic groups, hydroxyl groups, and two or more epoxy groups per molecule; (2) an epoxy functional polymer mixed with core-shell rubber particles; or a combination thereof.

27. The multi-layer elastic barrier coating of claim 20, wherein the at least one epoxy functional polymer comprises at least two of the following: (1) a polymer comprising aromatic groups, hydroxyl groups, and two epoxy groups per molecule; (2) a polymer comprising aromatic groups, hydroxyl groups, and greater than two epoxy groups per molecule; and (3) an epoxy functional polymer mixed with core-shell rubber particles.

28. The multi-layer elastic barrier coating of claim 20, wherein the at least one epoxy functional polymer comprises all of the following: (1) a polymer comprising aromatic groups, hydroxyl groups, and two epoxy groups per molecule; (2) a polymer comprising aromatic groups, hydroxyl groups, and greater than two epoxy groups per molecule; and (3) an epoxy functional polymer mixed with core-shell rubber particles.

29. The multi-layer elastic barrier coating of claim 20, wherein at least one of (a) the coating composition that forms the elastic barrier coating and (b) the coating composition that forms the adhesive coating layer further comprises a hydrazide functional component.

30. The multi-layer elastic barrier coating of claim 29, wherein the hydrazide functional component comprises a polymeric material comprising two or more hydrazide functional groups per molecule.

31. The multi-layer elastic barrier coating of claim 20, wherein the coating composition that forms the elastic barrier coating further comprises an additional polymer selected from a polyester, a polyether, a polysulfide, natural rubber, synthetic rubber, or a copolymer thereof, or a combination of any one of the foregoing.

32. The multi-layer elastic barrier coating of claim 20, wherein the coating composition that forms the elastic barrier coating further comprises a decorative component, wherein the decorative component comprises a pigment and a resin dispersed in an aqueous medium mixture.

\* \* \* \* \*